(12) United States Patent
Bang et al.

(10) Patent No.: US 9,157,416 B2
(45) Date of Patent: Oct. 13, 2015

(54) DIRECT-DRIVE ELECTRIC MACHINE CONFIGURED WITH A PLURAL-MODULE COMBINATION STRUCTURE

(75) Inventors: Deok Je Bang, Haeundae-gu Busan (KR); Bong Jun Kim, Gijang-gun Busan (KR); Jan Abraham Ferreira, Delft (NL); Henk Polinder, Delft (NL)

(73) Assignee: Korea Electrotechnology Research Institute, Gyeongsangnam-Do (KR)

( * ) Notice: Subject to any disclaimer, the term of this patent is extended or adjusted under 35 U.S.C. 154(b) by 674 days.

(21) Appl. No.: 13/496,807

(22) PCT Filed: Sep. 15, 2010

(86) PCT No.: PCT/KR2010/006290
§ 371 (c)(1),
(2), (4) Date: May 17, 2012

(87) PCT Pub. No.: WO2011/034336
PCT Pub. Date: Mar. 24, 2011

(65) Prior Publication Data
US 2012/0228965 A1    Sep. 13, 2012

(30) Foreign Application Priority Data
Sep. 18, 2009  (KR) .................. 10-2009-0088576

(51) Int. Cl.
*H02K 21/12* (2006.01)
*H02K 1/27* (2006.01)
(Continued)

(52) U.S. Cl.
CPC .............. *F03D 9/002* (2013.01); *H02K 7/1838* (2013.01); *H02K 7/1869* (2013.01); *H02K 21/12* (2013.01); *H02K 21/24* (2013.01); *F05B 2220/7066* (2013.01); *H02K 41/031* (2013.01); *H02K2201/12* (2013.01); *H02K 2201/15* (2013.01); *H02K 2213/12* (2013.01); *Y02E 10/725* (2013.01)

(58) Field of Classification Search
CPC ......... H02K 1/27; H02K 16/00; H02K 21/12; H02K 21/14; H02K 21/24
USPC ............... 310/12.18, 156.08, 156.19, 156.35, 310/156.43, 156.46, 156.51, 156.52, 310/156.59, 261.1, 156.07
See application file for complete search history.

(56) References Cited

U.S. PATENT DOCUMENTS

| 5,334,899 A * | 8/1994 | Skybyk .................. 310/268 |
| 2006/0192453 A1* | 8/2006 | Gieras et al. ............. 310/156.02 |

(Continued)

FOREIGN PATENT DOCUMENTS

| DE | 100 39 466 A | 11/2001 |
| DE | 102 55 745 A | 6/2004 |

(Continued)

OTHER PUBLICATIONS

Search Report from European Patent Office for corresponding European application EP 10817405.3 dated Jul. 4, 2014.
(Continued)

*Primary Examiner* — Michael Andrews
(74) *Attorney, Agent, or Firm* — Frommer Lawrence & Haug LLP

(57) ABSTRACT

The present invention provides a direct-drive electric machine such as a generator and a motor comprising a rotor or a mover and a stator. The direct-drive electric machine is configured with a plural-module combination structure in which the rotor or the mover and the stator are mutually combined such that a plurality of modules form one phase, respectively.

15 Claims, 27 Drawing Sheets

(51) Int. Cl.
*F03D 9/00* (2006.01)
*H02K 7/18* (2006.01)
*H02K 21/24* (2006.01)
*H02K 41/03* (2006.01)

(56) References Cited

U.S. PATENT DOCUMENTS

2007/0228858 A1* 10/2007 Malmberg ............... 310/156.01
2008/0211326 A1* 9/2008 Kang et al. ............... 310/156.02

FOREIGN PATENT DOCUMENTS

| DE | 10 2005 020 952 A | 11/2006 |
| DE | 10 2006 019 533 A | 10/2007 |
| JP | 2006-025559 | 1/2006 |
| JP | 4085059 B | 2/2008 |
| JP | 2008-509647 A | 3/2008 |
| KR | 10-2008-0061415 A | 7/2008 |

OTHER PUBLICATIONS

Chinese Office Action and Search Report; dated Mar. 4, 2014, Application No. 201080050587.7, entitled Direct-Drive Electric Equipment.

D. Bang et al., Possible Solutions to Overcome Drawbacks of Direct-Drive Generator for Large Wing Turbines, Mar. 19, 2009; pp. 1-10, The Netherlands.

D. Bang et al., Review of Generator Systems for Direct-Drive Wind Turbines, Mar. 31, 2008, pp. 1-11, The Netherlands.

* cited by examiner

FIG. 2A
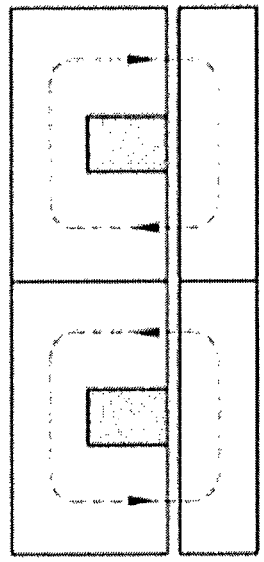
ONE-MODULE STRUCTURE
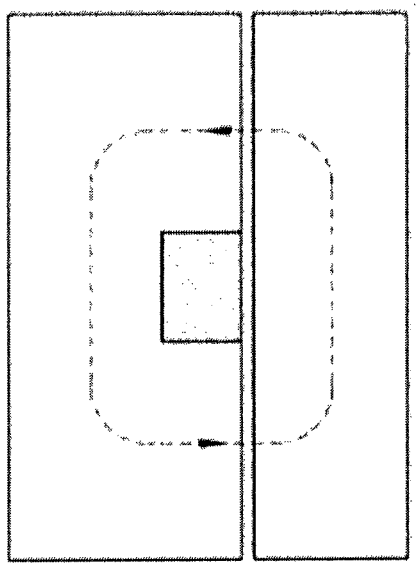
TWO-MODULE STRUCTURE

(a) BEARINGLESS QUADRUPOLAR PM MOTOR
INSIDE : QUADRUPOLAR TORQUE WINDING
OUTSIDE : BIPOLAR BEARING FORCE WINDING (b) QUADRUPOLAR AND
BIPOLAR WINDING LAYOUT
FOR BEARINGLESS-DRIVE (c) PMS: INSERT-TYPE PMS (d) PMS: BURIED-TYPE PMS

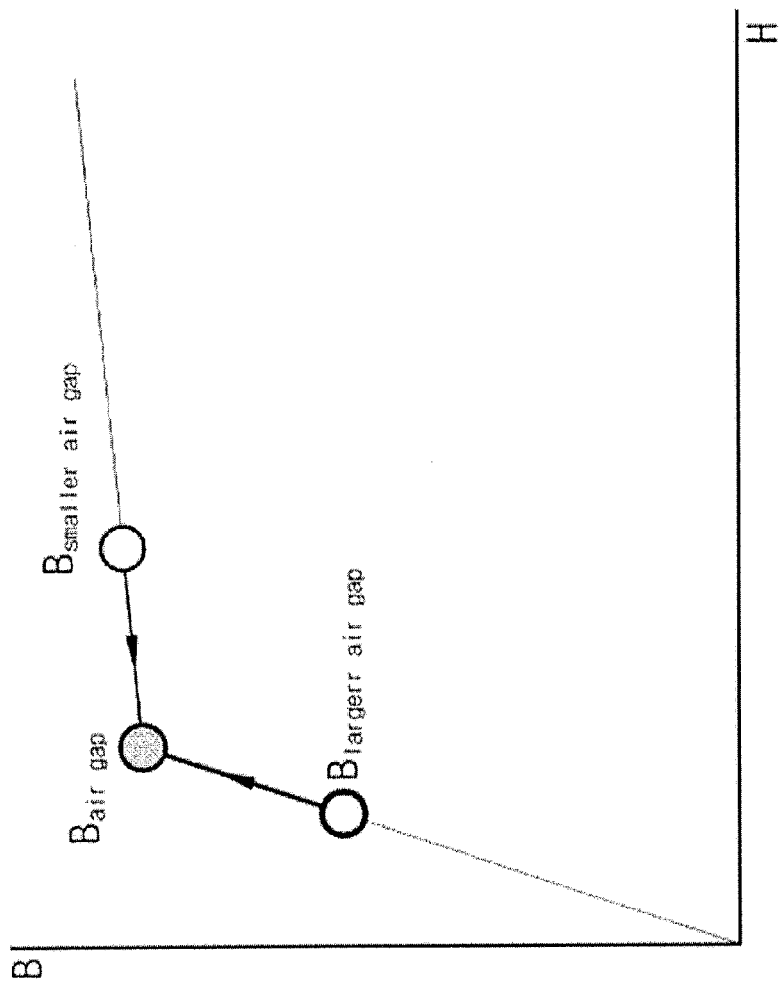

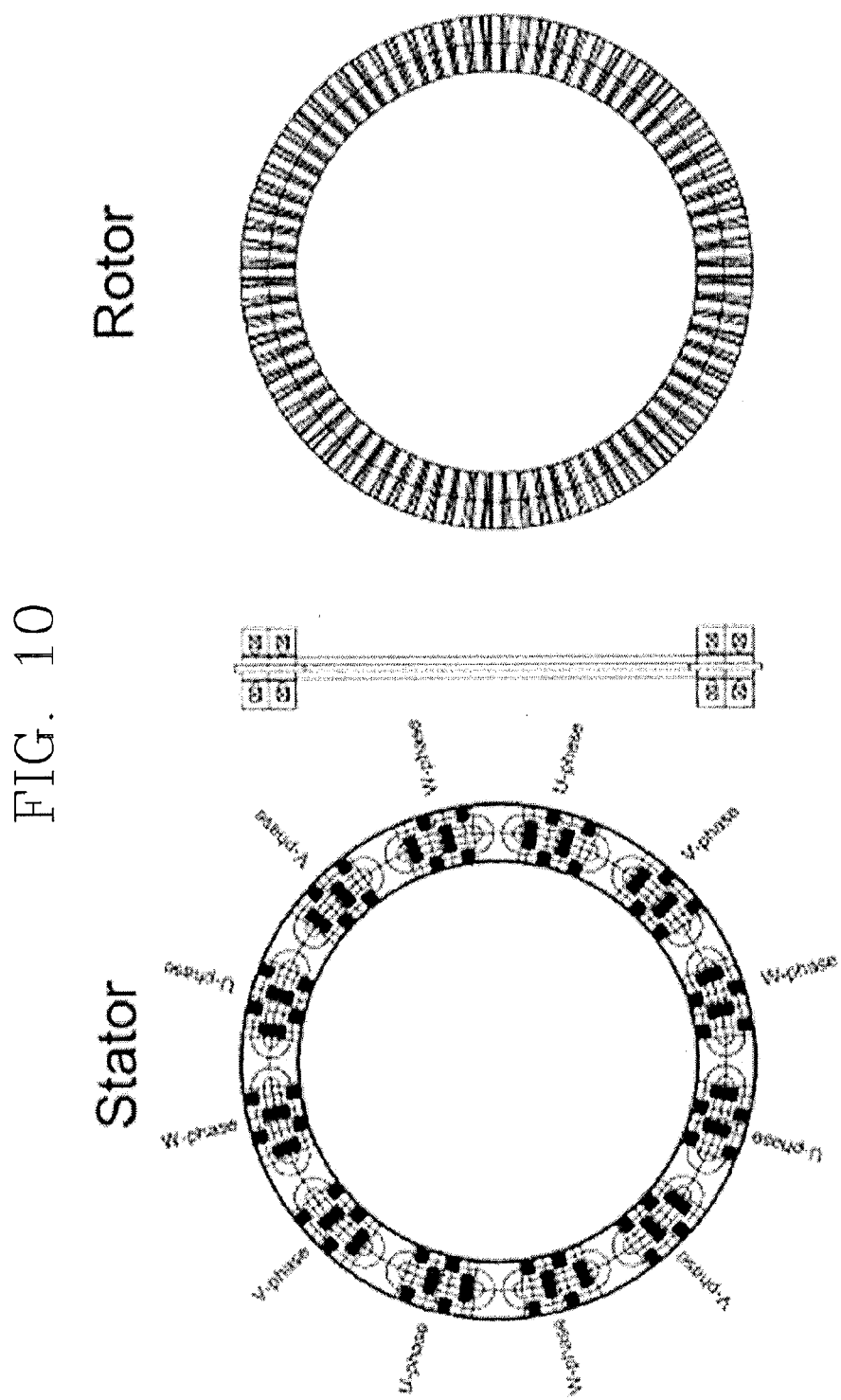

FIG. 13
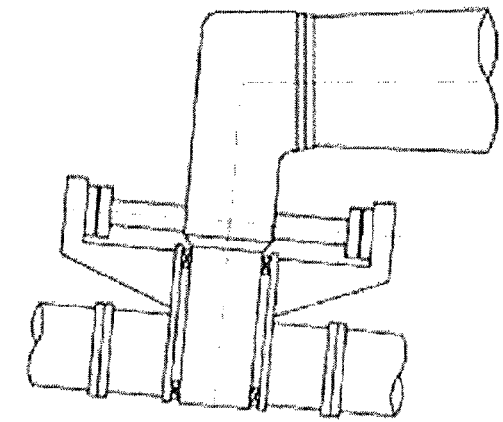
(A): DOUBLE BEARING AND INTERNAL GENERATOR ROTOR STRUCTURE
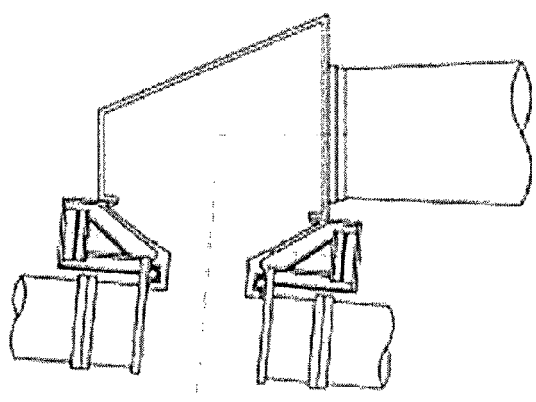
(B): SINGLE BEARING AND INTERNAL GENERATOR ROTOR STRUCTURE
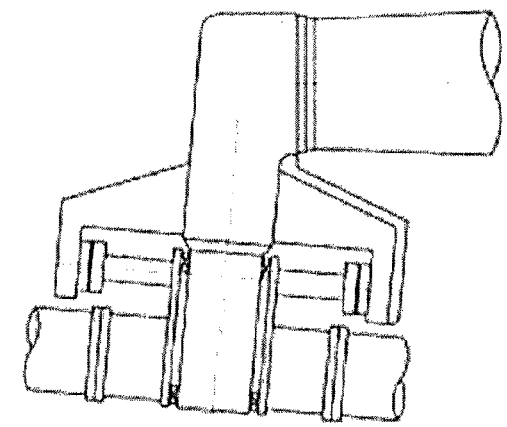
(C): DOUBLE BEARING AND EXTERNAL GENERATOR ROTOR STRUCTURE FIG. 14
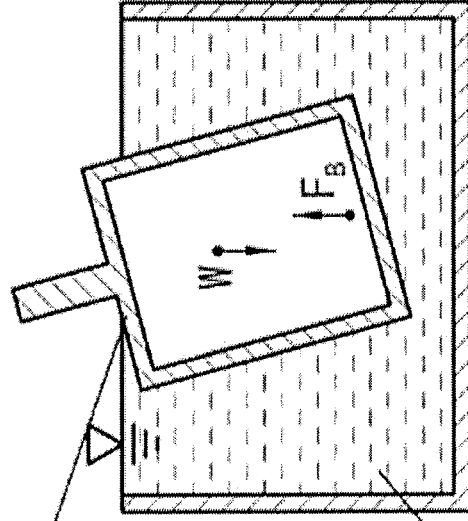
(A): STABLE STATE
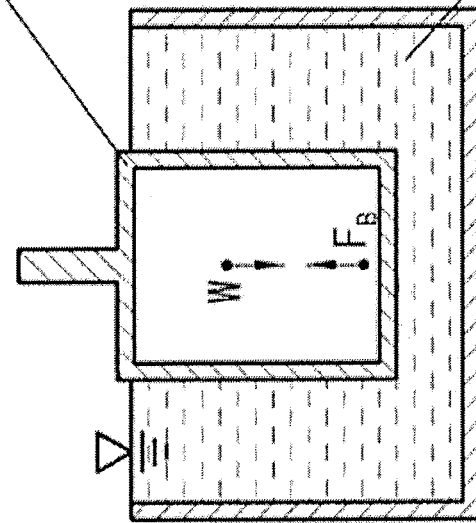
(B): UNSTABLE STATE
BUOYANT OBJECT
FLUID

DIRECT-DRIVE ELECTRIC MACHINE CONFIGURED WITH A PLURAL-MODULE COMBINATION STRUCTURE

CROSS-REFERENCE TO RELATED APPLICATION

This application is a 371 of PCT/KR2010/006290 filed on Sep. 15, 2010 published on Mar. 24, 2011 under publication number WO 2011/034336 A which claims priority benefits to Korean Patent Application Number 10-2009-0088576 filed Sep. 18, 2009, the disclosure of which is incorporated herein by reference.

BACKGROUND (a) Technical Field

The present invention relates to a direct-drive electric machine. More particularly, it relates to large-size and high-torque direct-drive permanent magnet electric machines for wind turbine generators, tidal-current power generators, hydraulic power generators, and motors.

(b) Background Art

Generally, direct-drive wind turbines consist of rotor blades, generator, and fixed part structures.

FIG. 1 illustrates a typical low-speed and large direct-drive wind turbine (wind generator). A direct-drive wind turbine 10 consists of rotating parts such as rotor blades 11 and a generator rotor 12, and stationary parts such as a shaft 13, a generator stator 14, and bearings 15 that enable the rotation of the generator rotor on the shaft 13.

The generator rotor 12 is directly connected to the rotor blades 11. Thus, the generator rotor 12 rotates at low speed as the rotor blades 11.

Accordingly, a high torque generator that has to handle a high tangential force and that has a large diameter is required for large direct-drive wind turbines. Therefore, large direct-drive generators have disadvantages such as large size, large mass and high cost in order to get high torque rating comparable to geared generators. These characteristics become more remarkable when the size and the output power of wind turbines increase, i.e., up-scaling.

It is known that the direct-drive generators are disadvantageous in cost but advantageous in energy yield and reliability compared to geared generators. However, as described above, if the mass and the cost of direct-drive generators significantly increase in accordance with the up-scaling, there is a limitation in applying an existing direct-drive generator technology to large wind turbine systems.

Accordingly, a new direct-drive machine technology is urgently needed to overcome the limitation of a typical large direct-drive machine technology.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a direct-drive electric machine, which can reduce the amount of material required to construct the machine and thus a manufacturing cost using an optimized structure, and can facilitate fabrication, transport, installation, and maintenance.

In one aspect, the present invention provides a direct-drive electric machine such as a generator and a motor including a rotor or a mover and a stator, the direct-drive electric machine configured with a plural-module combination structure in which the rotor or the mover and the stator are mutually combined such that a plurality of modules form one phase, respectively.

In an exemplary embodiment, the combination structure of the rotor or the mover and the stator may include a both-sided air gap structure in which the stator is disposed such that air gaps are formed at both sides of the rotor or the mover.

In another exemplary embodiment, the both air gaps between the rotor or the mover and the stator may be maintained by a bearingless-drive that maintains air gap by controlling a current applied to a copper winding of the stator, and the bearingless-drive is formed so as not to sustain a weight of the rotor or the mover.

In still another exemplary embodiment, the direct-drive electric machine may include a structure of an axial flux machine in which the direction of magnetic flux in the both air gaps is an axial direction.

In yet another exemplary embodiment, the direct-drive electric machine may include a left set of stator and rotor or mover and a right set of stator and rotor in which the rotor or the mover corresponds to the stator, respectively.

In still yet another exemplary embodiment, the rotor and the stator may be formed to have a ring-shape.

In a further exemplary embodiment, the direct-drive electric machine may include a transverse flux generator or a transverse flux motor.

In another further exemplary embodiment, the direct-drive electric machine may include a longitudinal flux generator or a longitudinal flux motor.

In still another further exemplary embodiment, the air gap between the rotor and the stator may be maintained by a hydrostatic bearing supporting the rotor by fluid pressure and buoyancy, and/or a bearingless-drive maintaining the air gap through control of a current applied to a copper winding of each stator.

In yet another further exemplary embodiment, as a generator or a motor: a ring-shaped fixed part filled with a fluid may be fixedly disposed in a fixed structure; a ring-shaped rotating part may be concentrically disposed inside the fixed part; a stator may be disposed inside the fixed part; a rotor may be disposed outside the rotating part at an opposite location to the stator; the fixed part may be filled with the fluid to maintain air gap; and the rotating part may be connected to rotor blades through a connection part extending to the outside of the fixed part.

In still yet another further exemplary embodiment, the rotor blades may be disposed at an outer circumference of the fixed part such that the rotating part is connected to the rotor blades through the connection part extending toward the outer circumference of the fixed part.

In a still further exemplary embodiment, the rotor blades may be disposed at an inner circumference of the fixed part such that the rotating part is connected to the rotor blades through the connection part extending toward the inner circumference of the fixed part.

In a yet still further exemplary embodiment, two permanent magnets may be included in each module of the rotor or the mover; an iron core with a triangular shape to make a flux path produced by the permanent magnets may be disposed between the two permanent magnets; a flux-concentrating iron core with an inverted triangular shape may be included in each module; the two permanent magnets may be disposed on both inclined surfaces of the flux-concentrating iron core, and each permanent magnet may be disposed between the inclined surface of the flux-concentrating iron core and an inclined surface of a flux path-making iron core, respectively.

In a yet still further exemplary embodiment, the plurality of modules may be separately configured to independently perform a function and an operation, respectively.

In a yet still further exemplary embodiment, the copper winding may have a racetrack-shaped structure.

In a yet still further exemplary embodiment, the direct-drive electric machine may include a linear electric machine (generator/motor) including a mover and a stator.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 2A illustrates a configuration for reducing materials of an active part and FIG. 2B illustrates a configuration for increasing an iron core area, respectively;

FIGS. 4A and 4B illustrate a lightweight and modular direct-drive generator for large wind turbines;

FIG. 9 is a view illustrating magnetic flux densities of different gap lengths;

FIGS. 10 through 12 are views illustrating a ring-shaped direct-drive generator (motor) according to an embodiment of the present invention;

FIG. 13 is a view illustrating different mechanical structures of direct-drive wind generators;

FIG. 14 is a view illustrating buoyant objects in (a) a stable state and (b) an unstable state;

Figure 1:
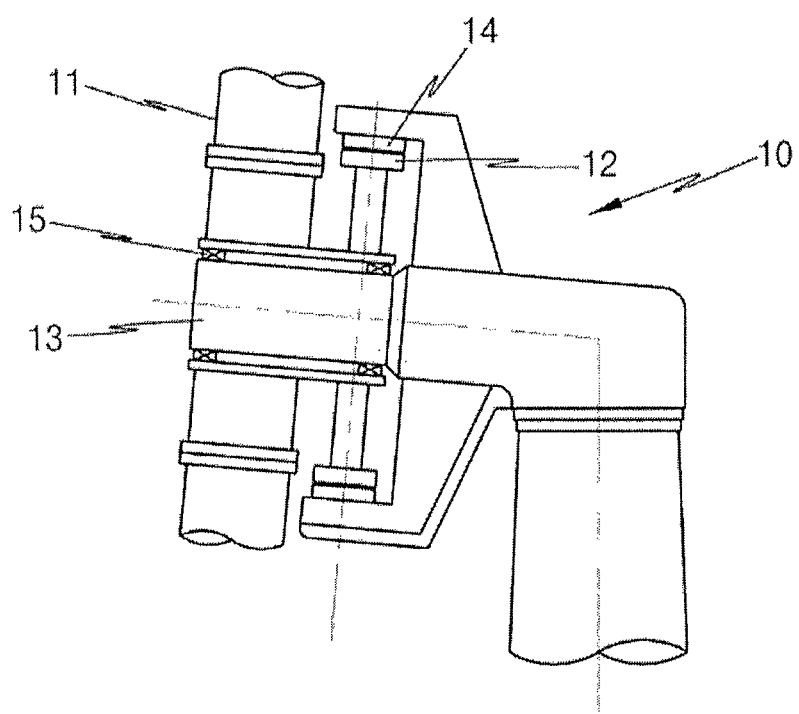
FIG. 1 is a view illustrating a direct-drive generator for a wind turbine.

Reference numerals set forth in the Drawings includes reference to the following elements as further discussed below:

| | |
|---|---|
| 10: wind turbine | 11: rotor blades |
| 12: generator rotor | 13: shaft |
| 14: generator stator | 15: bearing |
| 22: iron core | 23: iron core |
| 24: permanent magnet | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The above and other features of the invention are discussed infra.

Hereinafter, exemplary embodiments of the present invention will be described in detail with reference to the accompanying drawings.

Generally, a direct-drive generator may be roughly divided into an electromagnetic part or an active part used to produce electricity and a structural part or an inactive part constituting a generator structure. Both parts need to be carefully considered in the design of the generator, i.e., electromagnetic design and mechanical design. Since there may be difficulties in the fabrication, transport, installation, and maintenance of a large direct-drive machine, practical issues upon design also need to be carefully considered.

The electromagnetic part and the structural part require a structure that can reduce the amount of materials used and can finally reduce the manufacturing cost. Also, in regard to the practical issues, the structure which is easy to fabricate, transport, install and maintenance is required, and methods for maximizing the electric power production may be needed. Solutions for the issues can be described in brief as follows.

Electromagnetic Part/Active Part
    Permanent-magnet machine with high force density.
    Structure capable of reducing active materials by shortening the length of magnetic flux path.
    Structure capable of increasing magnetic flux by having an increased iron core area.

Structural Part/Inactive Part
  Structure capable of significantly reducing inactive materials using bearingless-drive method.
  Practical Issues
    Structure facilitating fabrication, handling, transport, installation, and maintenance by having modular structure including a plurality of module that are separately configured.
  Structure in which each module can be independently operated by having modular structure including a plurality of modules that are separately configured. Accordingly, although a fault occurs in a specific module or component, other modules or components can continuously produce electric power. For example, assuming that a 10 MW generator system consists of five modules, the output of each module may be about 2 MW. When a fault occurs in a module, information on the fault can be acquired through a sensor. Hence, control and operation may be performed such that electric power can be continuously produced only by other four modules. Accordingly, a fault tolerance concept may be needed to continuously produce electric power (about 8 MW) until the fault is corrected, without halt of the whole system even though there is a fault in any component.
    Flexible and Lightweight structure, structure that has a bearing with a large diameter and therefore need not to be excessively heavy, strong and precise, and structure that does not need a bearing requiring precision regarding a main shaft.

Figure 2B:
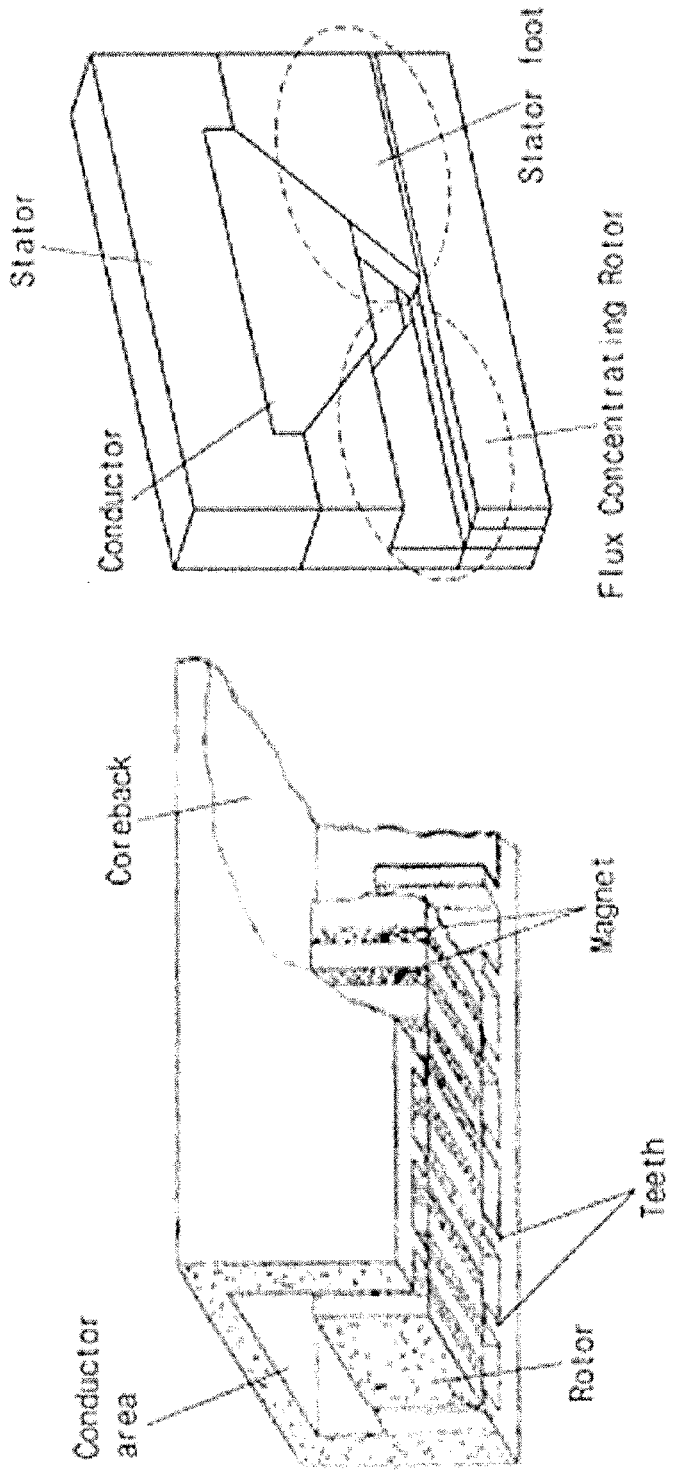
Figure 3:
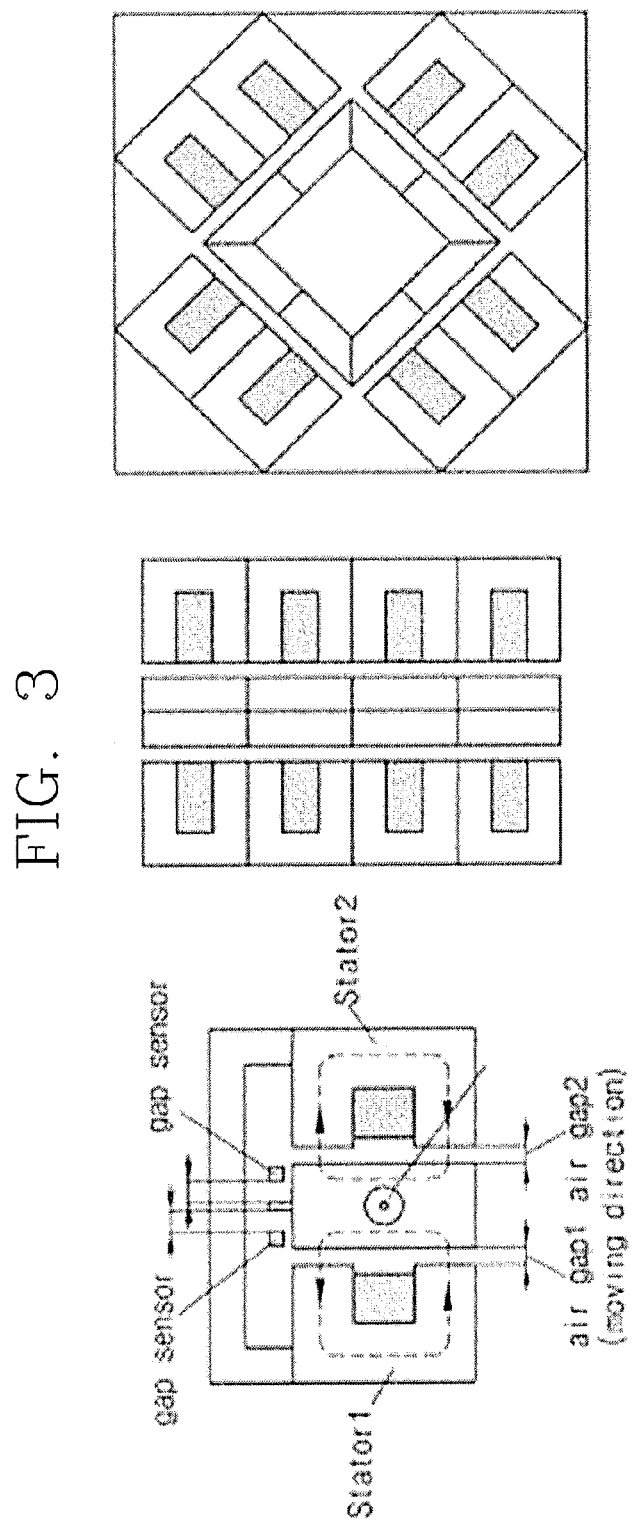
FIG. 3 is a view illustrating air gaps maintained by a bearingless drive.

The above-described solutions are shown in FIGS. 2 through 4.

In order to overcome a limitation of a low-speed and high-torque direct-drive electric machine (generator/motor), the above-described solutions need to be reflected in design and operation. In order to meet the above-described solutions, the direct-drive electric machine has been considered to have the following three features, and the configurations for achieving each feature will be described in detail with reference to the accompanying drawings.

maximization of force density and minimization of active materials
  minimization of inactive materials
  new guiding and bearing systems Maximization of Force Density and Minimization of Active Material Permanent magnet machines (generators/motors) may have advantages in terms of higher power to weight ratio, higher efficiency, higher reliability, and higher energy yield compared to electrically excited machines. Accordingly, a structure of a permanent magnet machine may be used in the present invention to maximize the force density of a large wind turbine generator and minimize the active material. The permanent magnet machine may be classified into an axial flux permanent magnet (AFPM) machine, a radial flux permanent magnet (RFPM) machine, and a transverse flux permanent magnet (TFPM) machine according to the direction of magnetic flux. In this case, the force density of TFPM machine may be relatively higher than those of other machines, and the active material may be reduced compared to other machines. Accordingly, a new structure of TFPM machine may be provided in the present invention to maximize the force density and minimize the active material.

With regard to FIG. 3, designing a generator (or motor) it is required to minimize the amount of the iron core and the copper in order to minimize the losses of a generator (or a motor). The amount of iron core used may be reduced by reducing the flux path while maintaining the area of the iron core where the flux is interlinked in an air gap. In order to reduce the flux path, the slot pitch and the slot height have to be reduced. However, in a typical longitudinal flux generator (or motor), if the slot pitch is reduced, the pole pitch may be together reduced, increasing the leakage flux. Accordingly, there is a limitation in reducing the amount of iron core used in the longitudinal flux generator (or motor). On the other hand, in a transverse flux generator (or motor), although the slot pitch is reduced, the pole pitch may not be reduced. Accordingly, the structure in which the iron loss is reduced by reducing the amount of iron core may be advantageous to the transverse flux generator (or motor).

Examples of TFPM machines may include surface mounted PM type, flux-concentrating PM type, single-winding type, double-winding type, single-sided air gap type, double-sided air gap type, C-core type, E-core type, and claw pole core type. Compared to other types, the flux-concentrating PM type has the advantage of reducing the weight and the volume due to a higher force density. Also, the single-winding type and the single-sided air gap type may be easily structured. The claw pole core type may have the advantage of increasing the induced voltage by increasing the area of the iron core where the flux is interlinked.

Considering the winding structures of TF machines, the ring-shaped winding has been mostly used for small diameter machines. However, when the ring-shaped winding is used for a large direct-drive machine, there may be difficulties in terms of fabrication, installation, and maintenance. Accordingly, a modular-shaped winding that does not have a large diameter like a ring-shaped winding may be useful for a large direct-drive machine, which will be described in brief as follows.

Figure 5:
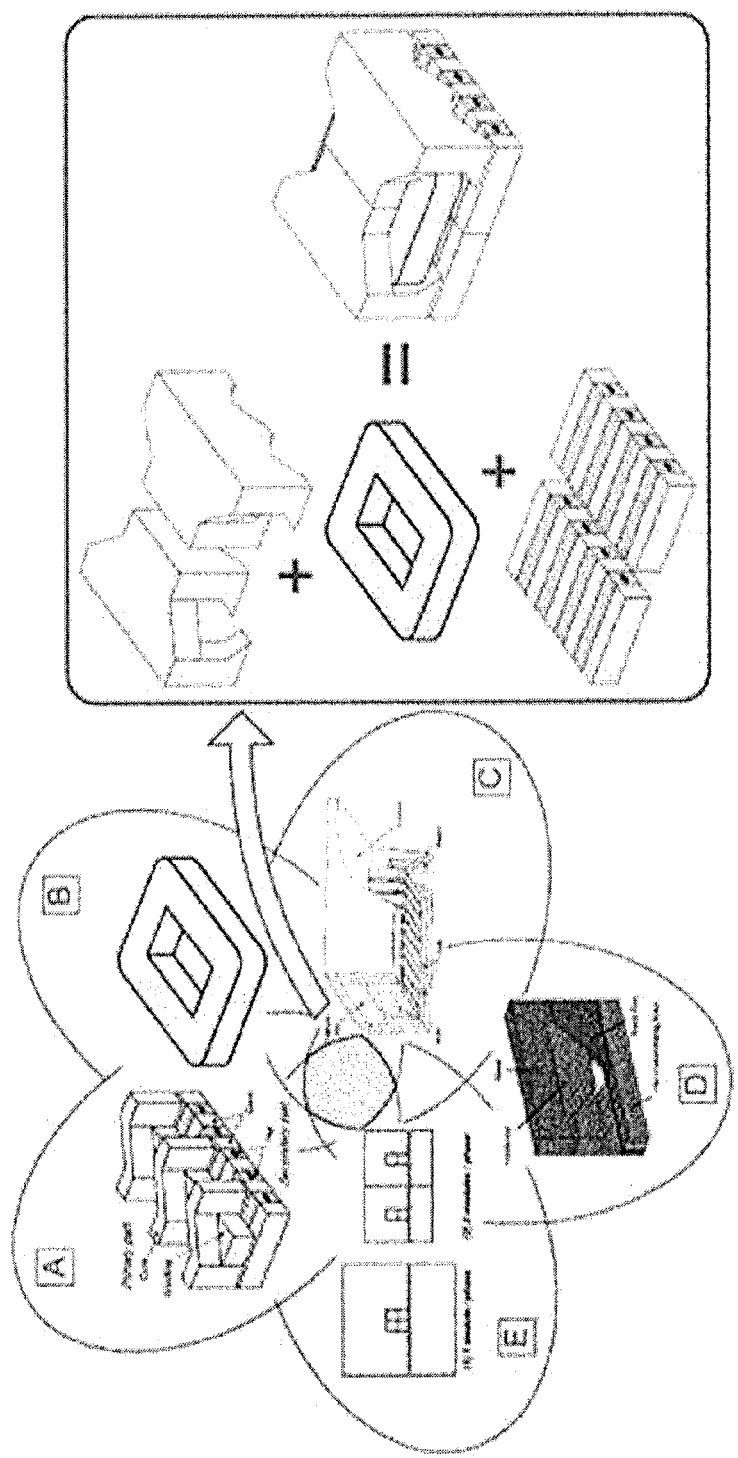
FIG. 5 is a view illustrating a structure of a new TFPM machine.

1) Concept A: Single-sided air gap, single-winding, and flux-concentrating TFPM machines
  2) Concept B: Modular-shaped winding suitable for machine having a large diameter instead of a ring-shape winding
  3) Concepts C and D: Increased iron core area to produce higher induced voltage
  4) Concept E: Plural-module concept with short flux path to reduce the active material by reducing slot pitch and height FIG. 5 is a view illustrating the configuration of a new TFPM machine. The concepts A, B, C, D and E are shown in the left side of FIG. 5, and a new concept having all advantages of the concepts A, B, C, D and E is shown in the right side of FIG. 5. Here, claw pole cores may be stator iron cores, and the component having a rectangular shape may represent a modular-shaped winding having a racetrack shape. Also, a flux-concentrating core having a hexahedral shape may be interposed between hexahedral-shaped permanent magnets (PM) such that permanent magnets and iron cores are alternately disposed. Arrows indicated on permanent magnets may represent, the magnetization direction of permanent magnet.

A of the left drawing of FIG. 5 represents one of typical structures of a transverse flux generator (or motor), and B represents the use of a plurality of Modularized windings suitable for a transverse flux generator (or motor) having a large diameter. Ring-shaped windings may be widely used in a typical transverse flux generator (or motor), and there are many difficulties in various terms of fabrication, installation, and maintenance to use the ring-shaped winding in the transverse flux generator (or motor) having a large diameter. Since the generator of a large direct-drive wind turbine has a very large diameter, the winding shown in B of FIG. 5 may be included in plurality in the direct-drive electric machine (generator/motor) according to an embodiment of the present invention. C, D and E of FIG. 5 may be well-known structures. E may represent an initial concept that can reduce the amount of iron core (or iron core and permanent magnet (PM)) used in the generator (or motor). The right drawing of FIG. 5 shows a basic structure according to an embodiment of the present invention, which is characterized in that a rotor (or mover) is modified into a structure shown in FIG. 6F.

When increasing the output power and size of the direct-drive PM machine, the air gap diameter, the diameter of rotor and stator, of the machine is increased together with the increases of the electromagnetic dimensions, that may include air gap length, pole pitch, pole width, and permanent magnet length. When using large size of permanent magnets, the fabrication (manufacturing) and handling of the magnets may be more difficult, thus the cost of the permanent magnets and the cost of the permanent magnet machines may increase. When the permanent magnet and the flux-concentrating iron core as shown in FIG. 5 are used, the detachment of the permanent magnet may occur as shown in FIG. 6A.

Figure 6:
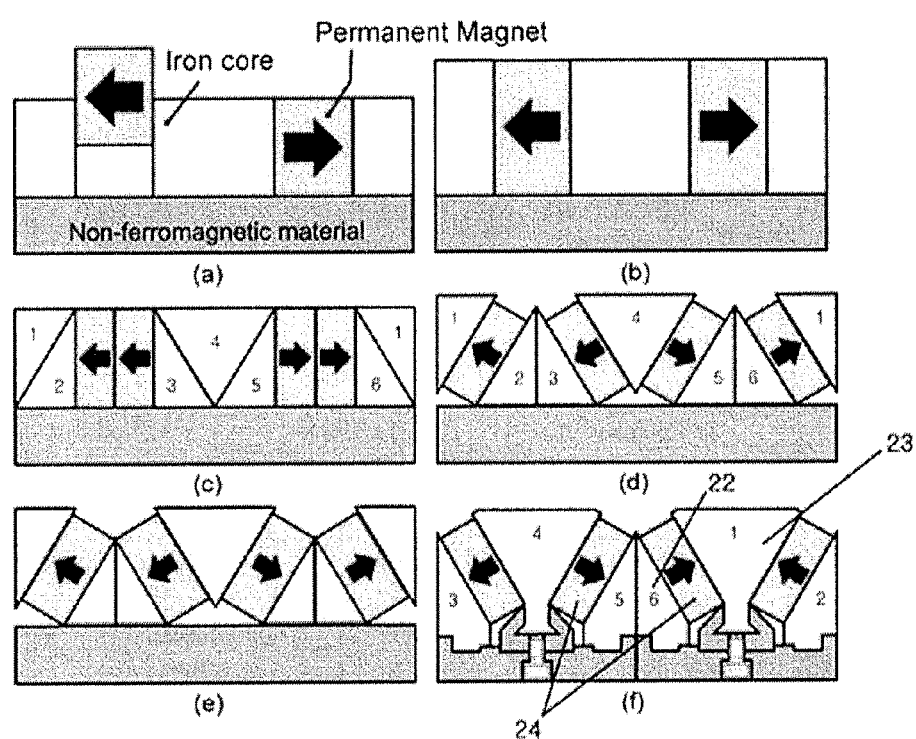
FIG. 6 is a view illustrating a structure of a flux-concentrating TFPM machine according to an embodiment of the present invention, which shows a structure that can avoid the detachment of a permanent magnet.

More specifically, the structure of FIG. 6A may be applied to a flux-concentrating permanent magnet generator (or motor), and may be used in longitudinal flux type and transverse flux type generators (or motors) in common. As shown in the drawing, when bonding permanent magnets to affix iron cores, the magnets can detach during the operation of the generator (motor). Also, since the permanent magnets are large and thick, the magnets may be difficult to manufacture and handle. In order to increase the amount of the permanent magnets, it is impossible to change the thickness of the permanent magnet while maintaining the pole pitch, thus the heights of the permanent magnet and the iron core have to be simultaneously increased.

Accordingly, as described above, the detachment of the permanent magnet can be avoided while reducing the manufacturing cost regarding the permanent magnet, and the amount of the permanent magnet can be increased without increasing the amount of the iron core. The structure according to an embodiment of the present invention, that enables to reduce the manufacturing cost related with permanent magnets, to avoid the detachment of the magnets and to increase the amount of the magnets without increasing the amount of the iron cores, is shown in FIG. 6F. The details on it are described as follows.

The structure of FIG. 6A may be modified to the structure segmented as FIG. 6C, and the iron cores and the permanent magnets may be rearranged as in FIG. 6D. FIG. 6E represents that the amount of the magnets is increased similarly to that of FIG. 6B without increasing the amount of the iron core. The structure of FIG. 6F, which can improve limitations of the structure of FIG. 6A and the structure of FIG. 6B, may be a rotor (or mover) structure according to an embodiment of the present invention. As shown in the drawing, in order to avoid the detachment of the permanent magnets and overcome the difficulty of handling, two thinner-hexahedral permanent magnets 24 may be used instead of one thick permanent magnet for each module in a rotor or a mover including a plurality of modules. Also, an iron core 22 having a triangular shape may be disposed between the permanent magnets 24 to make the flux path of the permanent magnet. A flux-concentrating iron core 23 having an inverted triangular shape (in an exemplary embodiment, inverted conic flask section as an inverted triangular section as shown in FIG. 6F) may be disposed in each module, and the two permanent magnets 24 may be disposed on both inclined surfaces of the flux-concentrating iron core 23. In this case, the permanents 24 of adjacent modules may be disposed on the inclined surfaces of the iron core 22 having a triangular section, respectively. Each permanent magnet 24 may be disposed between the inclined surface of the flux-concentrating iron core 23 and the inclined surface of the iron core 22 for making the flux path.

Thus, the structure that can avoid the detachment of the permanent magnet and facilitate the fabrication and handling may also be applied to typical RFPM machines and AFPM machines having longitudinal flux as well as transverse flux machines.

Minimization of Inactive Material

The functions of the inactive part (structural part) of direct-drive wind generators could be defined as follows.

To maintain the air gap between rotor and stator of generator

To transmit the torque from the rotor blades to the generator rotor

In case of small-size direct-drive machines, the weight of the active part may account for a large part. However, it is known that the weight of the inactive part becomes dominant in the total weight of the machines in up-scaling. This is why a higher torque generator is required according to the increase of its size in the case of the direct-drive wind turbine. Accordingly, the following items may be considered to minimize the inactive material.

1) Bearingless permanent magnet machine
2) Ring-shaped permanent magnet machine without shaft and other structures (torque arms)

Prior to description of a bearingless-drive permanent magnet machine, the principle and the features of a typical bearingless-drive will be described. Next, a method for overcoming limitations of a typical bearingless-drive and more simply implementing a typical bearingless-drive will be described. Thereafter, a ring-shaped permanent magnet machine without a shaft, a structure necessary for transmitting torque and a structure necessary to maintain the air gap that are included in a typical direct-drive machine will be described.

The bearingless-drives have been used to solve problems in certain special applications such as in outer space, harsh environments and in high speed machines. The various bearingless drives discussed and proposed by some researchers can be classified as follows.

1) Bearingless PM machine drives
2) Bearingless synchronous reluctance machine drives
3) Bearingless induction machine drives
4) Bearingless switched reluctance machine drives
5) Bearingless homopolar, hybrid and consequent-pole machine drives Of these bearingless drives, a bearingless permanent magnet machine drive has the following advantages.

1) Small size and lightweight
2) High power factor and high efficiency
3) Suspension forces generated without excitation current in the main winding
4) High inverter fault independence because magnetic suspension operates independently of the machine winding current Thus, the bearingless PM machine drive concept may be used in the present invention.

Figure 7A:
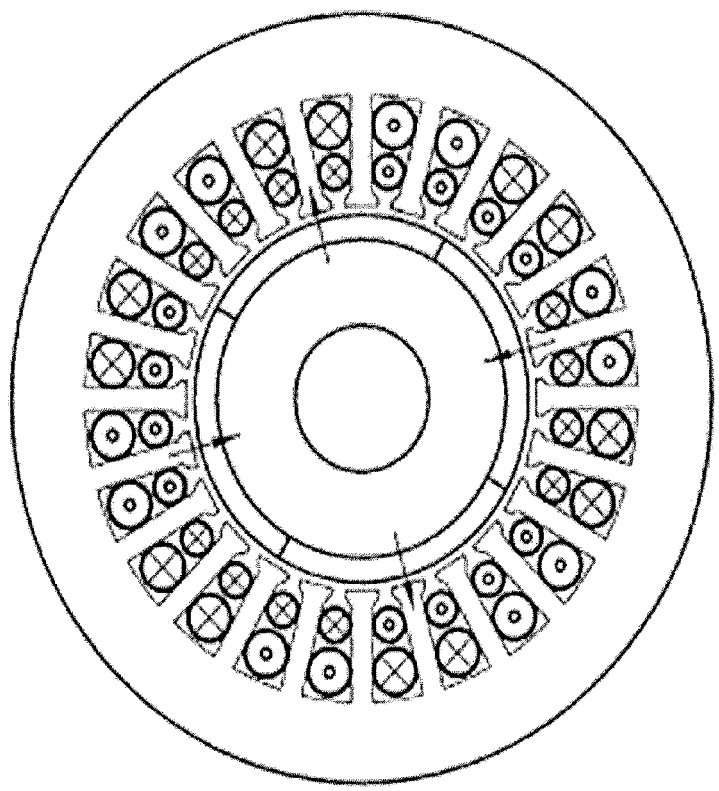
FIGS. 7A-7D illustrate typical bearingless-drive concepts, FIG. 7A showing windings of a bearingless 4-pole PM motor, FIG. 7B showing 4-pole and 2-pole winding arrangements of a basic bearingless drive, FIG. 7C showing a rotor with an inset type PMs of a bearingless motor, and FIG. 7D showing a rotor with a buried type PMs of a bearingless motor, respectively.
Figure 7B:
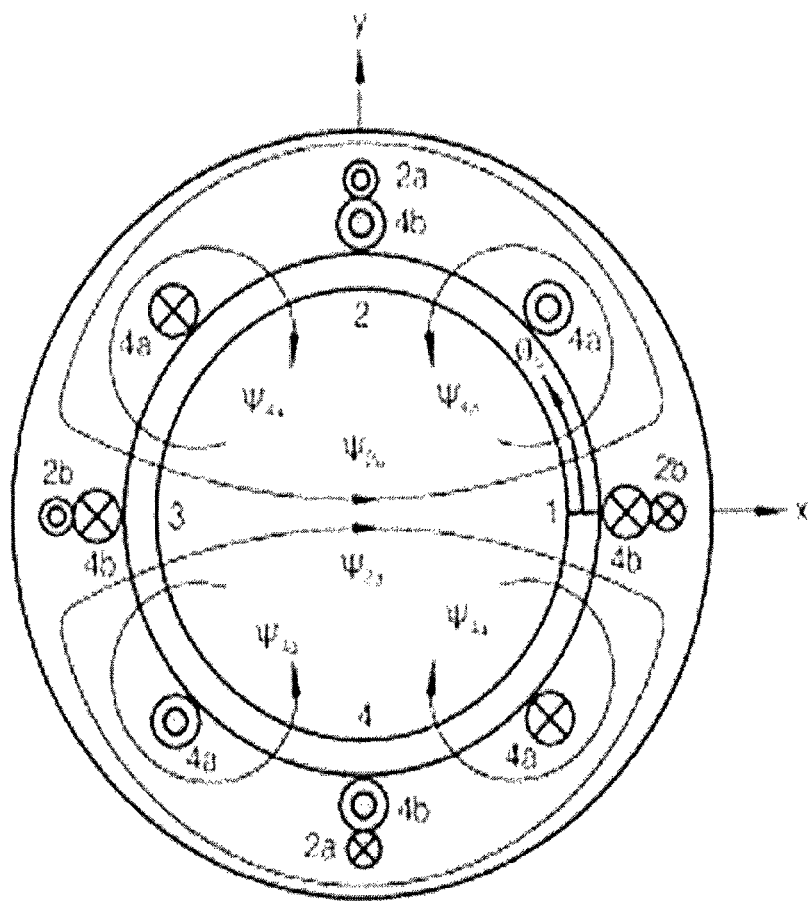
Figure 7C:
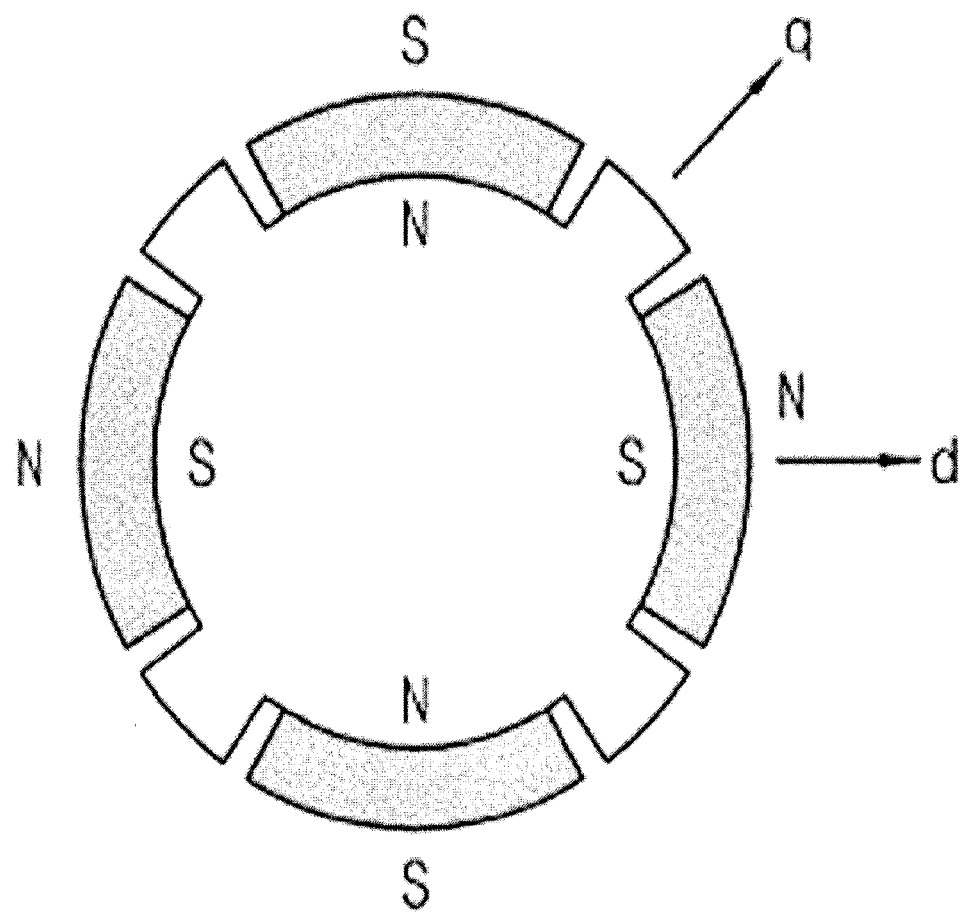
Figure 7D:
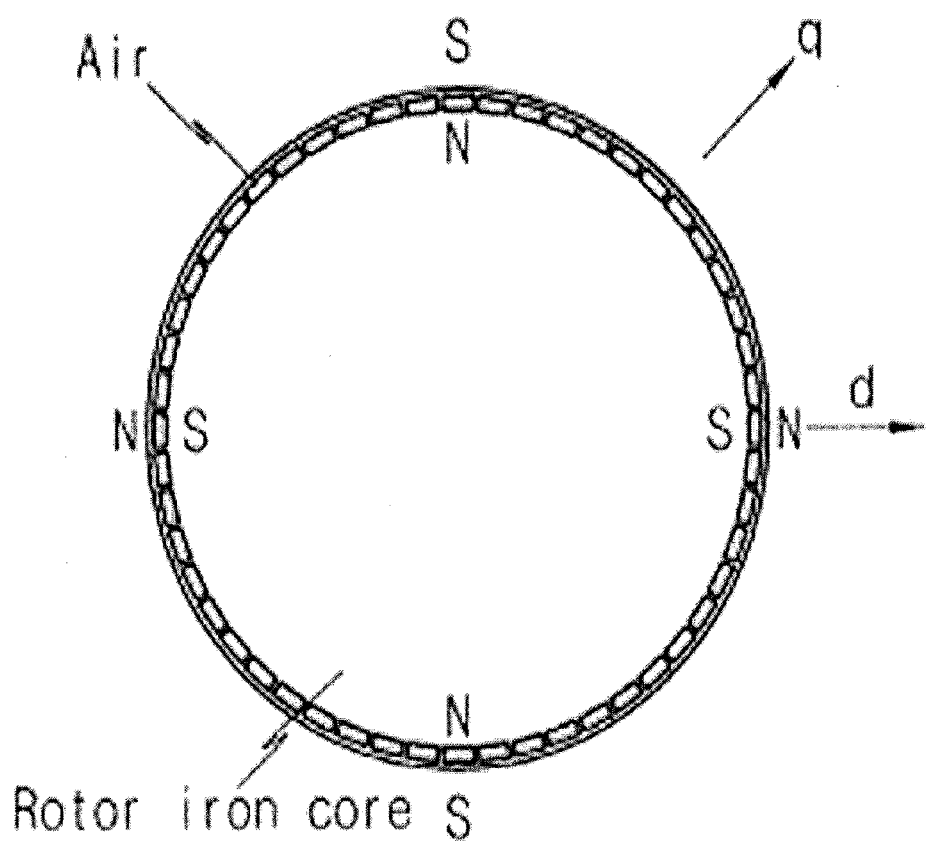

A significant feature of the bearingless drive is that the bearing winding is integrated into the electric machine. FIG. 7A illustrates the winding construction of the bearingless PM machine with four-poles. In order to achieve extensive decoupling between the generators of the radial suspension forces and the torque, the bearing windings and torque windings are designed with different numbers of poles. The winding arrangement of a primitive bearingless drive can be simplified as shown in FIG. 7B. Here, the windings for four-poles are 4$a$ and 4$b$, and the windings for two-poles are 2$a$ and 2$b$. Among various types of bearingless PM machine drives, the rotor structure with inset PMs and the rotor structure with buried PMs of bearingless PM machines are shown in FIGS. 7C and 7D, respectively. The buried PM-type rotor shown in FIG. 7D can improve the radial suspension force generation because of the low PM magnetic reluctance.

As described above, bearingless drives need to control both the radial suspension force with bearing windings and the torque with torque windings. Accordingly, bearingless-drives are more complicated and expensive than the conventional electric machine drives.

In the case of a large direct-drive wind generator, the weight of the inactive part may account for a large part of the total weight of the generator. If a bearingless drive could contribute to significant weight reduction and cost reduction of the generator, then the use of the bearingless drive could be acceptable for large direct-drive applications. However, in the case of the large direct-drive machine, since the weight (including the weight of the active part and the weight of the inactive part) of a rotor is very heavy, it is expected that the power consumption of producing the radial suspension force, for supporting the rotating part against the gravity, will be large for large direct-drive wind generators. Accordingly, the following requirements must be fulfilled in order to use the bearingless drives in large direct-drive applications to be acceptable.

Figure 8A:
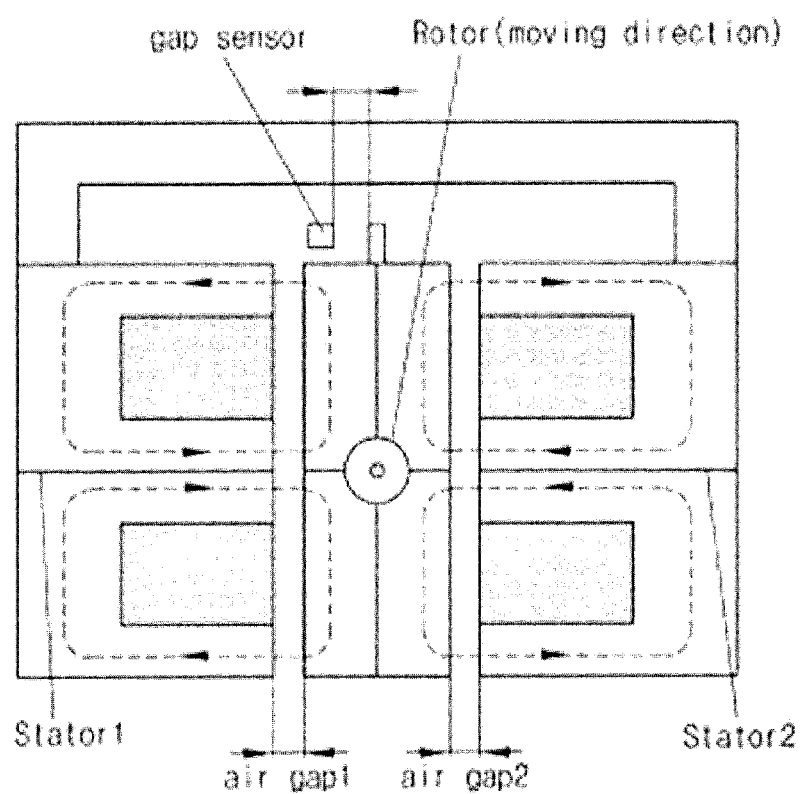
FIGS. 8A-8C illustrate a bearingless TFPM machine according to an embodiment of the present invention, FIG. 8A showing the moving direction of a rotor and the path of magnetic flux, FIG. 8B showing control of an air gap length and a current in a stator winding using gap sensors, and FIG. 8C showing configuration of more preferable bearingless-drive.
Figure 8B:
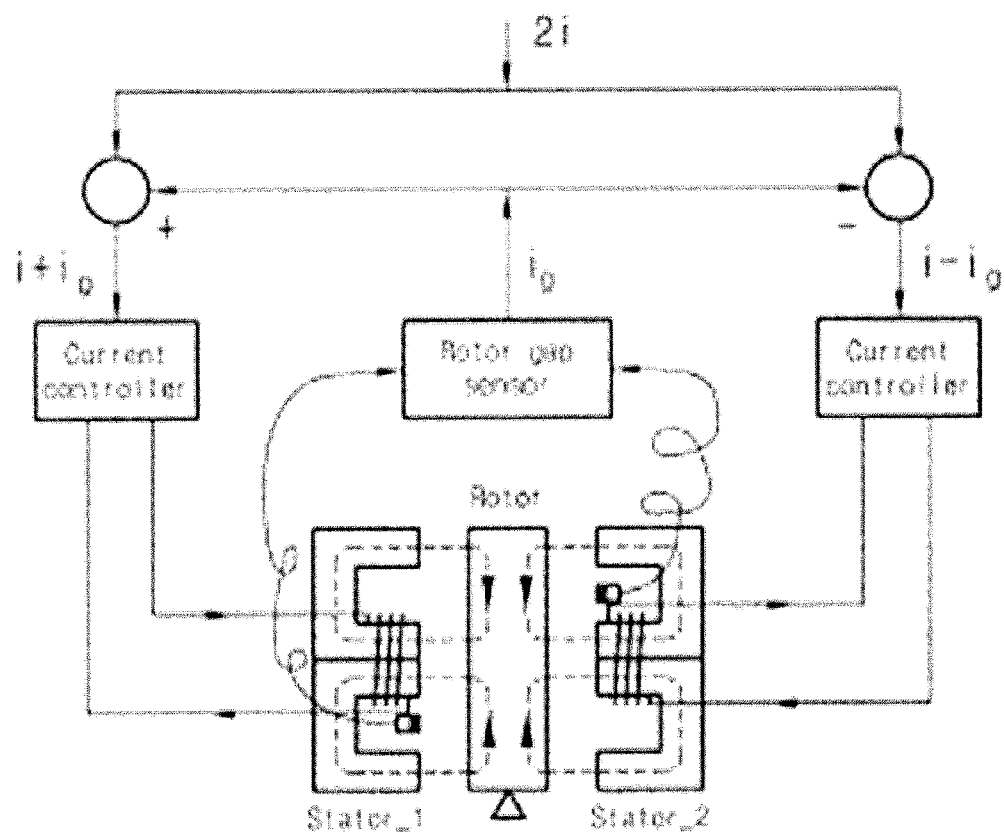
Figure 8C:
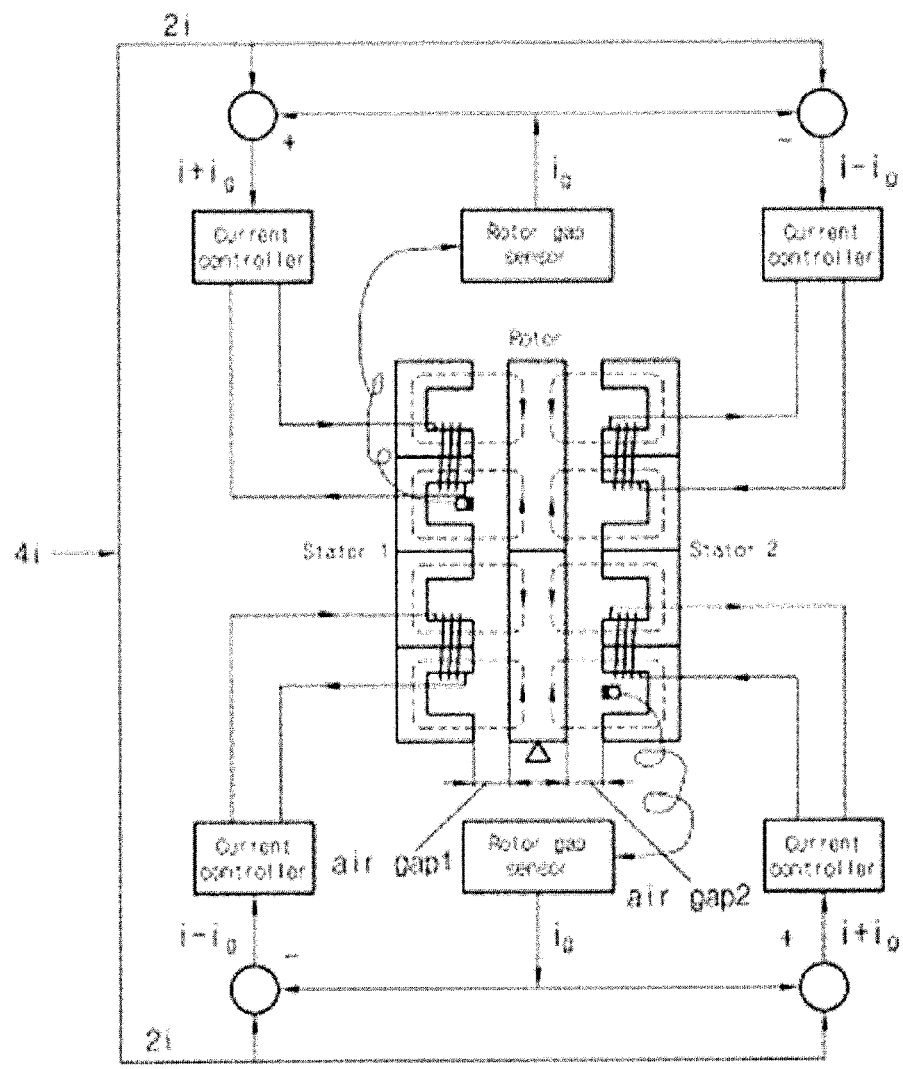

(1) Significant mass reduction of the inactive part
(2) Minimized power consumption in process of producing the suspension force
(3) Simplified control and components The new PM bearingless-drive according to an embodiment of the present invention may also include iron cores and permanent magnets in the rotor. Also, the stator may consist of iron cores and the windings. FIGS. 8A-8C illustrate a bearingless PM machine drive according to an embodiment of the present invention, which has a shape of a both-sided axial flux machine. As shown in FIGS. 8A-8C, the suspension force is only used to control the air gap length between the rotor and the stator, is not used to support the weight of the rotor. The bearingless-drive concept shown in FIGS. 8A-8C may be similar to the structure of the TFPM machine shown in FIG. 5, but may also be applied to a typical PM machine (longitudinal flux PM machine).

FIGS. 8A-8C represent a new bearingless drive concept which transmit torque and control the air gap length without a mechanically guiding structure used for conventional generators (or motors). A conventional generator (or motor) includes an electromagnetic part or an active part for producing electricity and a structural part or an inactive part including bearings, a shaft, and structures for transmitting torque and keeping air gap length. The bearingless-drive generator (or motor) according to the embodiment of the present invention is distinct from a typical bearingless-drive generator (or motor) requiring both bearing windings and torque windings.

As shown in FIGS. 8A-8C, the bearingless-drive generator (or motor) according to the embodiment of the present invention may have a both-sided air gap structure. The air gaps at both sides may be uniformly maintained by applying different magnitudes of currents to windings when the gap lengths at both sides are different from each other. Unlike a typical bearingless-drive structure, both windings may not be needed to generate a torque and a suspension force, but either of the windings may be needed to generate the torque and the suspension force.

The moving direction of the rotor and the flux path are shown in FIG. 8A. When the new bearingless-drive structure is in a stable state, the lengths of an air gap 1 and an air gap 2 may be equal to each other. When the lengths of the air gap 1 and the air gap 2 are different from each other, i.e., unstable state, a difference between the air gap lengths at both sides can be seen by a difference between no-load induced voltages applied to stators 1 and 2 at both sides or a gap sensor. When the length of the air gap 1 is greater than the length of the air gap 2, if an attraction force between the stator and the rotor at the air gap 1 increases and an attraction force at the air gap 2 is reduced, the rotor may move to a point where the lengths of both air gaps are equal to each other. To this end, the magnitude of a current i flowing in the winding of a stator 1 may be increased, and the magnitude of a current flowing in the winding of a stator 2 may be reduced.

The attraction force and flux due to the permanent magnet may exist. Accordingly, when the length of the air gap 2 is too small, the attraction force at the air gap 2 may be much greater than that at the air gap 1. Thus, although the current of the stator 1 is increased and the current of the stator 2 is reduced, there may be a limitation in equalizing both air gaps. In this case, a method of reducing the attraction force at the air gap 2 by reversing the direction of the current flowing in the stator 2 may be used.

When the rotor vibrates on the axis of the rotation direction or the moving direction, the air gap length at the upper side of both air gaps and the air gap length at the lower side of the both air gaps may become different from each other. Accordingly, this limitation may not be sufficiently overcome only by the bearingless-drive structure shown in FIGS. 8A and 8B. FIG. 8C shows a bearingless-drive structure that can more preferably overcome the above limitation according to an embodiment of the present invention. Due to the above structure, the air gap 1 and the air gap 2 may be uniformly maintained even when the rotor vibrates on the axis of the moving direction.

Accordingly, if the gravitational location of the rotor can be uniformly maintained within a desired range by any method or guiding, the bearingless-drive structure proposed in the present invention may be used in a large direct-drive machine as well as a wind power turbine.

When the lengths of the air gap 1 and the air gap 2 are different from each other, the flux density B in each air gap may vary, and thus the magnitude of the attraction force existing between the rotor and the stator may also vary. Specifically, when other dimensions and parameters do not vary but only the air gap length varies, the flux density may be reduced at the side where the air gap length increases, and may be increased at the side where the air gap length decreases.

In FIGS. 8A-8C, the gap sensor may be auxiliarily used to detect the variation of the air gap length. While the generator (or motor) is operating, the variation of the air gap length may be detected by measuring and comparing no-load induced voltages applied to each winding instead of using the gap sensor. However, since the no-load induced voltage is difficult to measure at the initial operation stage or abnormal state of the generator, the gap sensor may be used.

In FIG. 9, the flux densities with respect to different air gap lengths are shown in consideration of the characteristics of the flux density of the iron core that nonlinearly varies in its characteristics according to the magnitude of the magnetic intensity H (the actual flux density of the iron core is not linearly shown like FIG. 9 but is curvedly shown). In the bearingless-drive generator (or motor) as described above, when the air gap length at one side decreases, the air gap length at the other side increases. FIG. 9 shows the flux density variation of both air gaps on a B-H curve.

In FIG. 9, $B_{air\ gap}$ is a flux density at the stable state where the air gap 1 and the air gap 2 are equal to each other, and $B_{smaller\ air\ gap}$ and $B_{larger\ air\ gap}$ denote the flux densities of a smaller air gap and a larger air gap when the air gap 1 and the air gap 2 are different from each other, respectively.

Figure 4A:
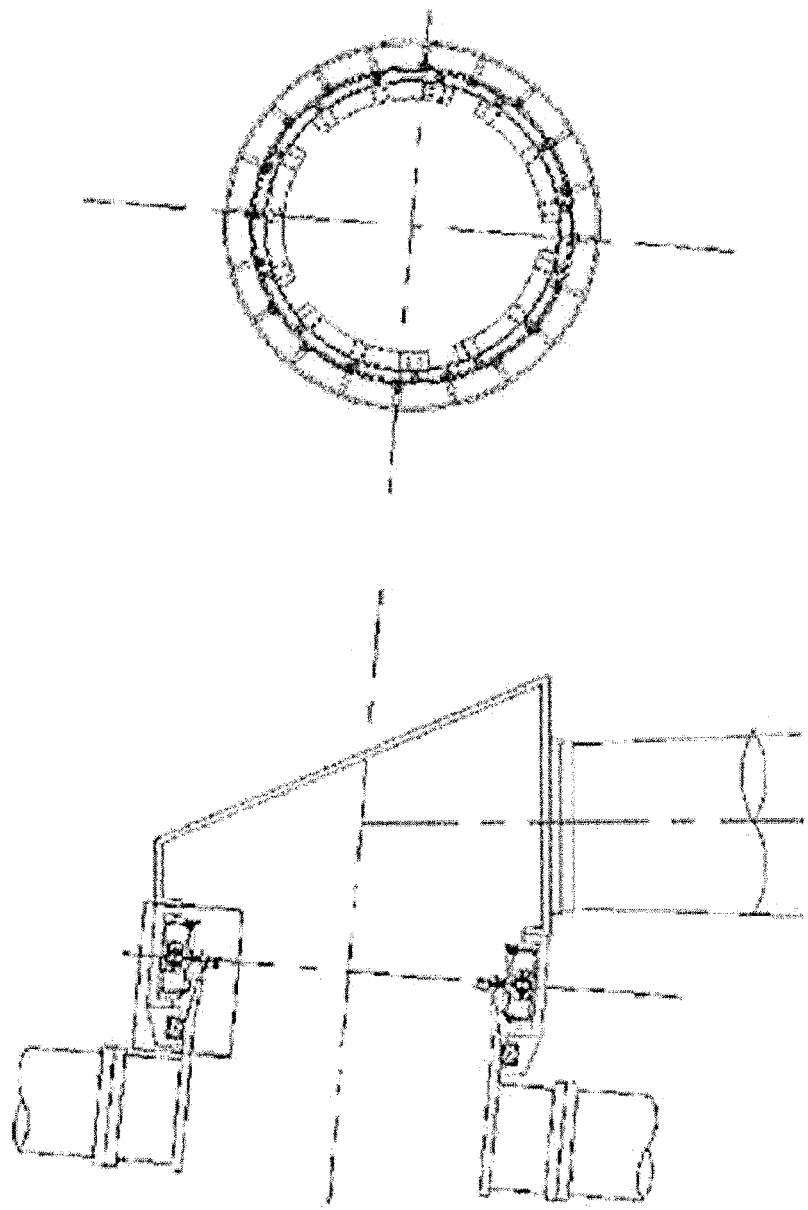
Figure 11:
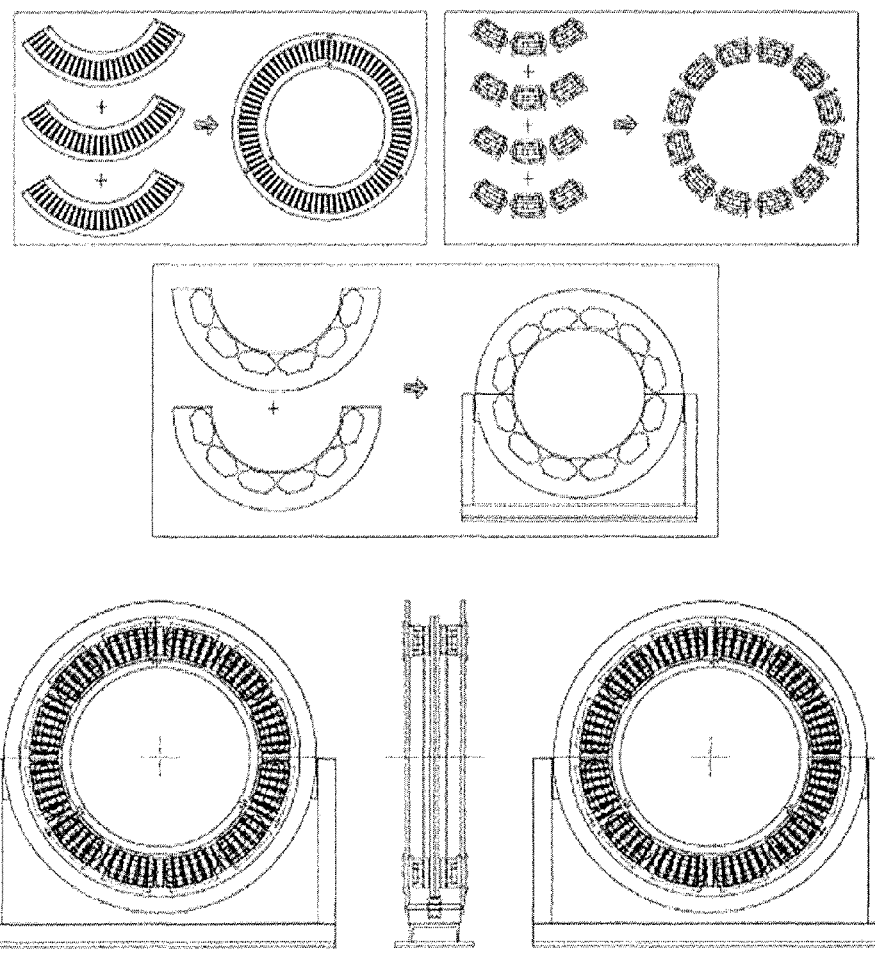
Figure 12:
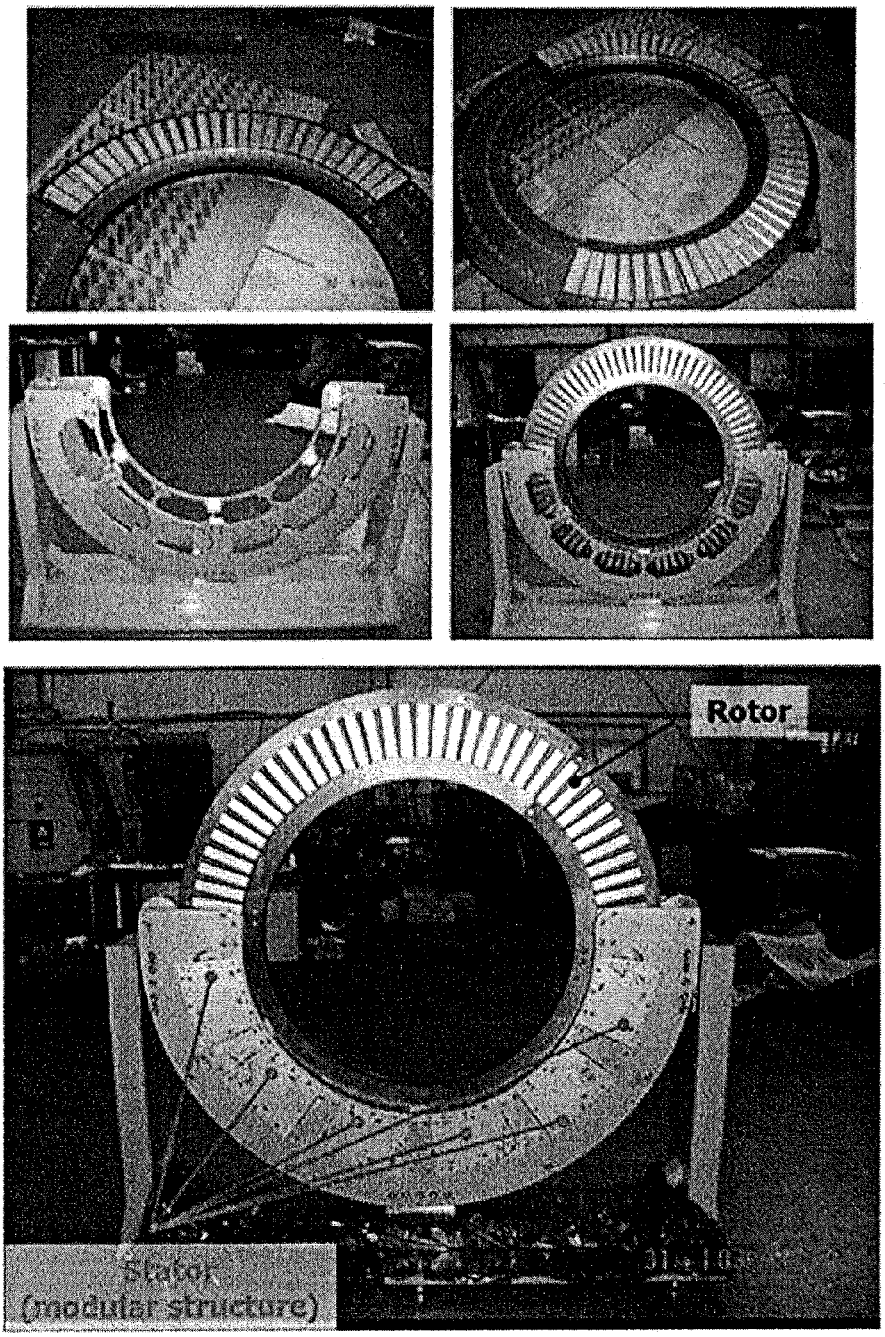

A second method that can significantly reduce the inactive mass may be to use a ring-shaped generator (motor) structure as shown in FIGS. 4A-4B. FIGS. 10 through 12 schematically show the shape of the ring-shaped generator (motor) structure, which will be described below.

FIGS. 10 through 12 show a ring-shaped transverse flux generator (or motor). The ring-shaped transverse flux generator (or motor) may be a both-sided air gap type, and may have an axial flux machine structure in which the interlinked flux direction in the air gap is an axial direction. The stators may be disposed at both sides of the rotor. Each stator may include an iron core and a copper winding. The rotor may include an iron core and a permanent magnet. As seen from the flux path shown in FIGS. 8A-8C, rotors corresponding to stators on both sides may exist. Accordingly, this structure may include a left set of stator and rotor and a right set of stator and rotor.

In the structure shown in FIG. 10, a shaft and an inactive structure necessary for maintaining air gap and transmitting torque, which are included in a conventional generator (or motor), may be maximally removed. Accordingly, the weight of the structure that has to be overcome in a large-size and high-torque direct-drive generator (or motor) can be significantly reduced.

When a large machine is integrally formed, there may cause considerable difficulties in fabrication, transport, installation, and maintenance. This may cause the increase of the product price. This structure has been widely used. In a typical generator (or motor), although a failure occurs in only a part or some components of a system, the operation of the generator (or motor) has to be stopped for repair and resumed. Stoppage of a generator (or motor) having a large output may have a severe influence on the whole operating system.

Thus, in order to improve the above-described limitations, the ring-shaped generator (or motor) may be modularized in plurality to achieve the following items.

(1) Overcome limitations generated in fabrication, transport, installation, and maintenance.

(2) Even when a failure occurs in some components or modules of generator (or motor), other modules having no failure can keep producing electricity or operating.

For this, the rotor; the stator, the power conversion device, and structures of the generator (or motor) may be configured in a modularized form, not in an integral form. In this case, when the generator (or motor) has a three-phase structure, each stator module may individually become a stator of a three-phase generator (or motor), and may be small only in output. Accordingly, the output of each module may be expressed as 'total output of generator (motor)/number of modules'.

FIGS. 11 and 12 illustrate a large ring-shaped transverse generator (or motor) according to an embodiment of the present invention, which include a plurality of modules. As shown in the drawings, the rotor may be partially manufactured in a module form and may be assembled into a circular rotor. The stator of a module form may have a structure that can be easily disassembled and assembled by module. Power conversion devices corresponding to each module may be coupled to the surfaces of each stator module. Thus, even when some stator and power conversion device modules have a failure, other modules can keep producing electricity (or operating).

When such a module-type structure is applied to a wind power turbine, other modules, can produce electricity even when some modules fail. Accordingly, the electricity production can be improved. Such a module-type structure may be applied to both generator and motor using a large direct-drive type, as well as a wind power turbine.

Also, although the ring-shaped generator (or motor) structure is shown as a transverse flux generator (or motor) in FIGS. 12 through 13, the ring-shaped generator (or motor) structure may be implemented using a longitudinal flux generator (or motor).

As shown in FIGS. 10 through 12, the ring-shaped generator (or motor) structure without a shaft and a structure for transmitting torque and keeping air gap length may also be applied to a low-speed and high-torque generator (or motor) (e.g., propulsion motor of ship and submarine, tidal- or water-power generator, etc.) in addition to a wind turbine.

In addition, this principle and structure may also be applied to a linear motor (or generator) (e.g., linear motor for transport system, linearly-reciprocating generator, etc.) in addition to a rotary generator (or motor).

New Guide and Bearing Systems

A typical direct-drive wind power turbine may use a typical bearing (e.g., mechanical bearing) to guide and support the rotor and the stator. Considering the configuration of the bearing and the generator rotor, the wind power turbine may be classified into (1) double bearing system, (2) single bearing system, (3) internal rotor system, and (4) external rotor system. FIG. 13 illustrates the structure of a typical direct-drive system usable in a wind power turbine. Referring to FIG. 13, a rotating part, a stator, and a bearing are shown. Limitations of a typical bearing system as shown in FIG. 13 may be summarized as follows.

The bearing and the structure in which the bearing is installed have to be precisely manufactured and operated. A typical bearing structure may be applied to a structure having a very large diameter, but there may be many difficulties to meet required bearing precision in the structure having the very large diameter.

Since a typical bearing has to endure an attraction force existing between the rotor and the stator of the generator and maintain the air gap length within a certain range in addition to supporting and guiding the rotor blade, load that the bearing takes charge of may be very great.

For this reason, a typical mechanical bearing system needs to be strong and precise. In order to apply such a typical bearing system to the bearingless-drive structure according to the embodiment of the present invention, the diameter of the bearing needs to become large similarly to the diameter of the generator. In this case, the bearing needs to support and guide both the weight of the rotor blades of the wind turbine and the weight of the generator rotor. In order to support and guide the weight of the rotor blades and the weight of the generator rotor using a bearing having a large diameter, the structure may become more precise, stronger, heavier, and more expensive.

When the rotation speed of a rotating body or the movement speed of a linearly-moving object is high, a structure of higher precision may be required for supporting and guiding the object. However, in the case of a relatively low-speed large-size and high-torque (or high-propulsion) machine, the object may be supported and guided by a structure with a relatively lower precision than a high-speed machine. Particularly, in the direct-drive wind power turbine, as the size of the turbine increases, the rotation speed of a rotating body may be reduced. Accordingly, if a heavy and large object can be supported and guided within a desired error range even when a bearing system having a lower precision than a typical bearing system is used, the limitations inherent in using the above-described typical bearing can be overcome.

For this, mechanical contact of a typical bearing may be removed from the bearing system. Accordingly, fluid bearing or magnetic bearing may be used to support and guide an object.

First, a fluid having a pressure capable of enduring the weight of an object needs to collide with the object in the opposite direction of the gravity force in order to maintain the object at a certain location in the gravitational direction using the fluid bearing. When the magnetic bearing is used, the suspension force needs to be increased in the opposite direction of the gravity force, and thus a bearing winding current needs to be increased. If an object is very heavy, energy consumption for supporting and guiding the object may be very large. Accordingly, a new concept bearing in which energy consumption for supporting and guiding an object is small may be needed. For this, a rotating body (or moving body) having buoyancy to support and sustain an object may be used in this embodiment of the present invention. Also, a hydrostatic bearing may be used to prevent contact or touchdown between a rotor (or mover) and a stator. When the hydrostatic bearing is used, the burden of the bearingless-drive structure for maintaining air gap may be lessened. Since the hydrostatic bearing can perform a certain percent of the function for maintaining air gap, the hydrostatic bearing may have the effect of reducing the peak load of the bearingless-drive structure. An additional description of the new bearing system will be made as follows.

1) Buoyant Rotating (or Moving) Body

A heavy structure may be easily lifted using buoyancy. If a rotating body or a moving body becomes a structure having buoyancy in fluid, the rotating body or the moving body may be easily located at a desired point against the gravity. Accordingly, an existing heavy, strong, and precise structure may not be needed anymore to maintain the gravitational location of the rotating body or the moving body within a certain range.

2) Hydrostatic Bearing

When a control failure occurs in a generator (or motor), or a defect occurs in any component such as power conversion device, the generator (or motor) and the bearingless-drive may be simultaneously stopped, causing damage of the structure due to contact between a rotor and a stator. Accordingly, the hydrostatic bearing may have a function of preventing damage due to the contact of the rotor and the stator, as well as a function of maintaining air gap together with the bearingless-drive.

The new guiding and supporting method may be used for a rotor structure of a large direct-drive generator/motor. Also, the new guiding and supporting method may be used to guide and support both rotor blades (or impellers, screws, etc.) and rotor structure of the generator/motor. Accordingly, since heavy structures for supporting and guiding rotating components can be omitted, the weight of the large direct-drive wind power turbine can be significantly reduced.

Hereinafter, the hydrostatic bearing and the rotating body (or moving body) having buoyancy will be described in more detail with reference to the accompanying drawings.

Figure 15:
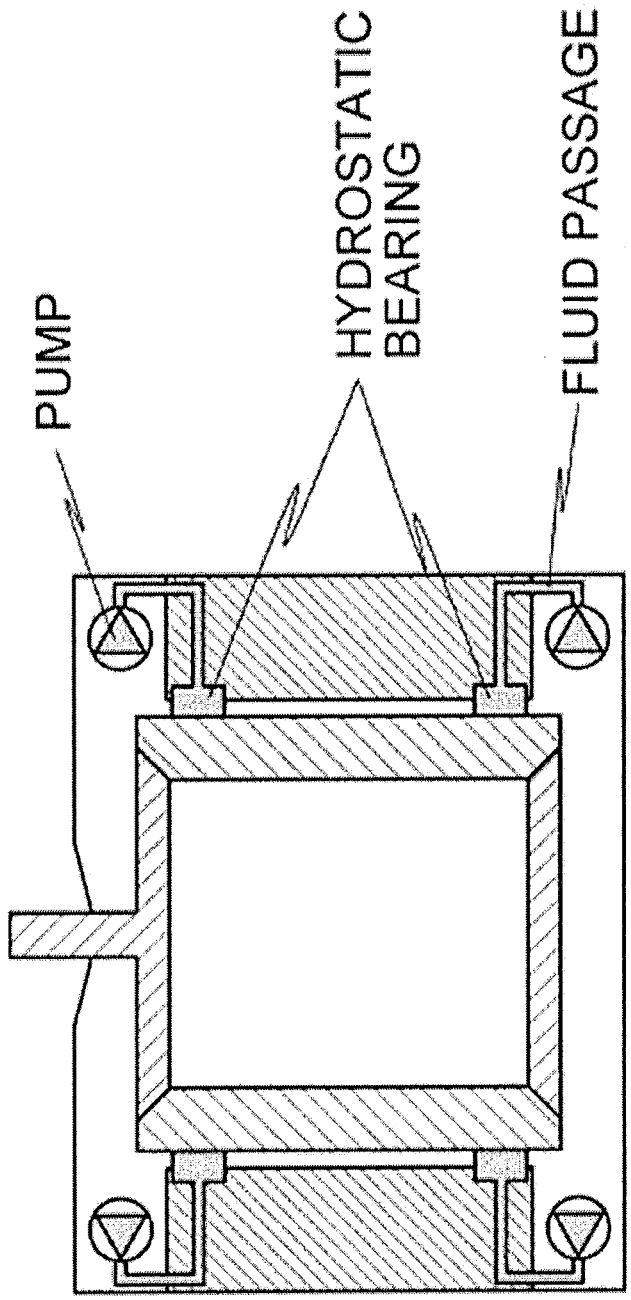
FIG. 15 is a view illustrating a buoyant rotating part and a stationary part with hydrostatic bearings.

FIG. 14 is a view illustrating a rotor having buoyancy, and FIG. 15 is a view illustrating the basic principle of a hydrostatic bearing.

FIG. 14A illustrates a stable state in which a buoyant object is in a fluid. The buoyant object may float in a fluid. FIG. 14B illustrates an unstable state in which a buoyant object is in a fluid and a force of swinging and overturning the object is generated. Accordingly, when the object is swung or overturned in the unstable state, and the opposite force of the swinging and overturning force is applied from the outside, the object may return to the stable state. To this end, a hydrostatic bearing may be used in this embodiment. The basic concept and structure of the hydrostatic bearing is shown in FIG. 15. Referring to FIG. 15, while a fluid supplied into a fluid passage by a pump is being maintained at a certain pressure, a rotating body may be supported by buoyancy.

Figure 16:
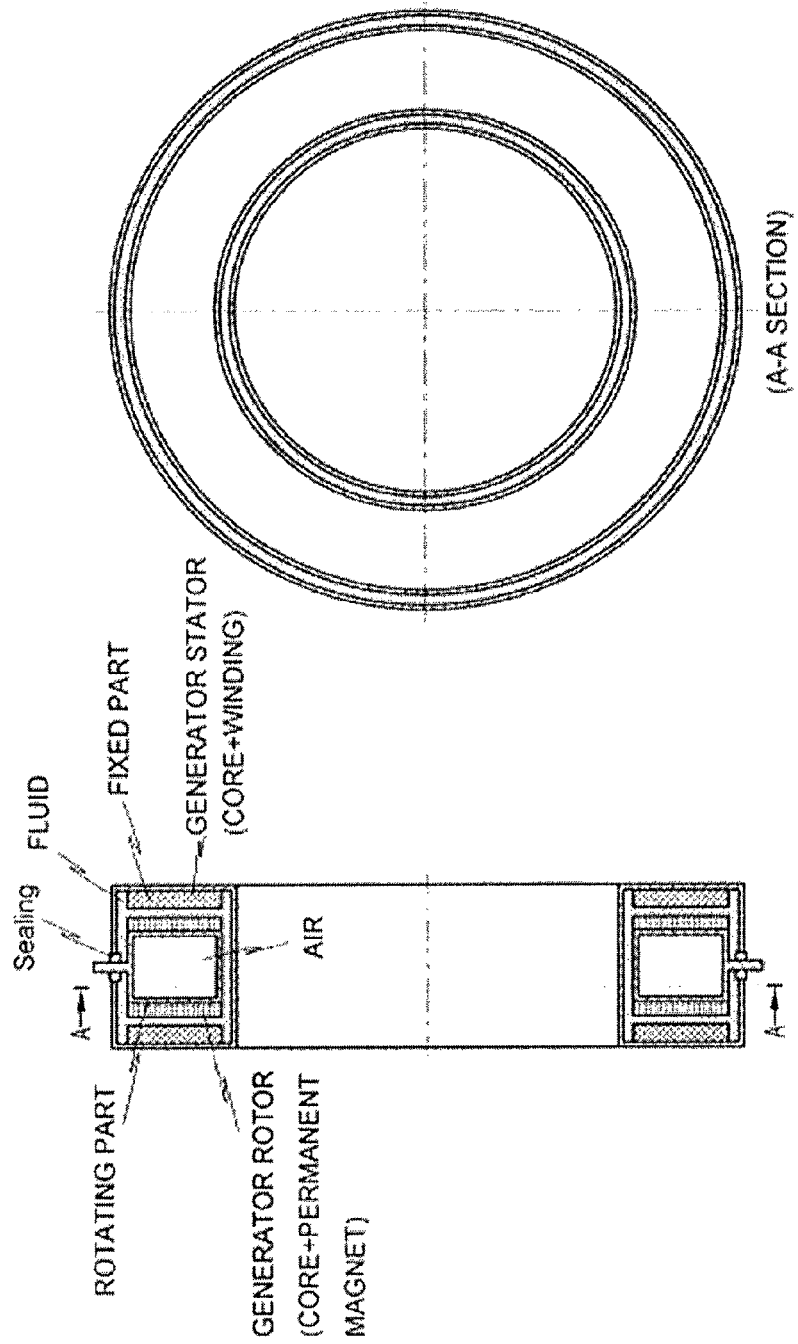
FIG. 16 is a view illustrating an electric machine with a buoyant rotor concept and hydrostatic bearings according to an embodiment of the present invention.
Figure 17:
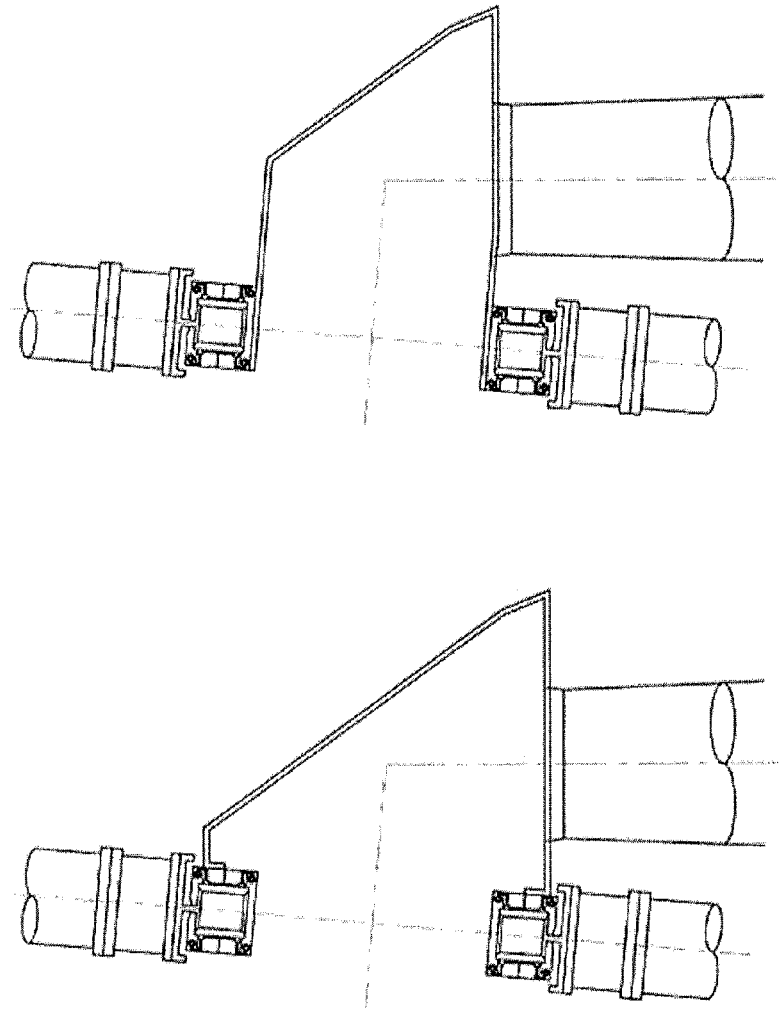
FIGS. 17 through 20 are views illustrating supporting and guiding structures of a generator rotor and rotor blades for direct-drive wind turbines according to an embodiment of the present invention.

When the buoyant rotating body and the hydrostatic bearing are applied, the structure may be configured as shown in FIG. 16. Such a structure may be applied to a large direct-drive system, and particularly, to supporting and guiding of the rotor blades of the direct-drive wind turbine and the generator rotor. Specifically, when the generator structure according to the embodiment of the present invention is applied to the wind power turbine, a structure in which the rotor of the wind power turbine is together combined may be implemented without being limited to the direct-drive wind power turbine generator. This is illustrated in FIG. 17. The ring-shaped bearingless generator, the buoyant rotor structure, and the hydrostatic bearing system may be integratedly applied to guide the rotor of the wind power turbine.

In the hydrostatic bearing structure shown in FIGS. 16 and 17, a ring-shaped fixed part filled with a fluid may be fixedly disposed in a fixed structure, and a ring-shaped rotating part may be concentrically disposed inside the fixed part. A stator may be disposed inside the fixed part, and a rotor may be disposed outside the rotating part at an opposite location to the stator. Also, a fluid may be filled in the fixed part to maintain air gap, and air may be filled in the rotating part. Particularly, rotor blades (impeller or propeller) may be integrally connected to a connection part that protrudes from the outer circumferential surface of the fixed part in a radial direction. The connection part may extend to the outside by a sealing member (sealing the fluid) installed at the outer circumferential surface of the fixed part to be connected to an outside rotor blade, and the rotor and rotating part may rotate integrally with the rotor blades in the fixed part. The application of the hydrostatic bearing may allow the rotating structure including the rotor to rotate with respect to the fixed structure while being supported by the pressure and buoyancy of the fluid.

Figure 18:
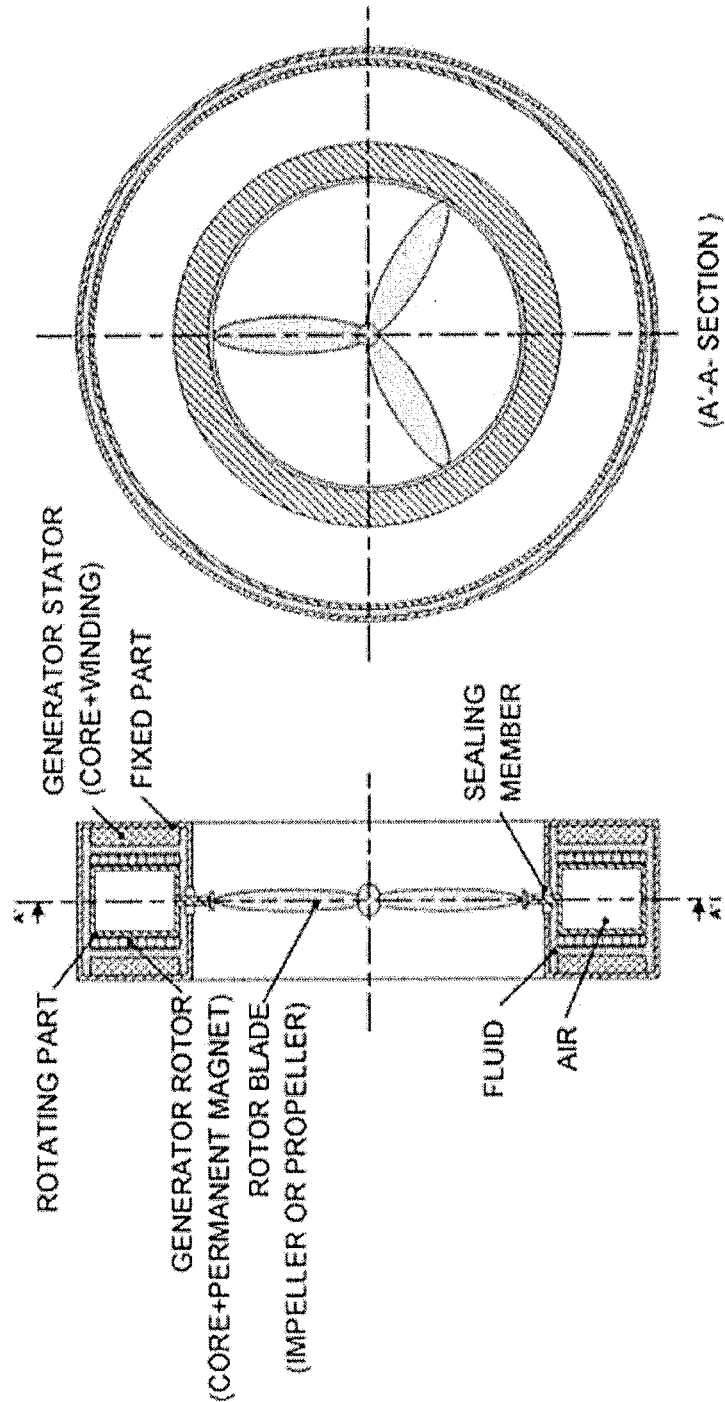
Figure 19:
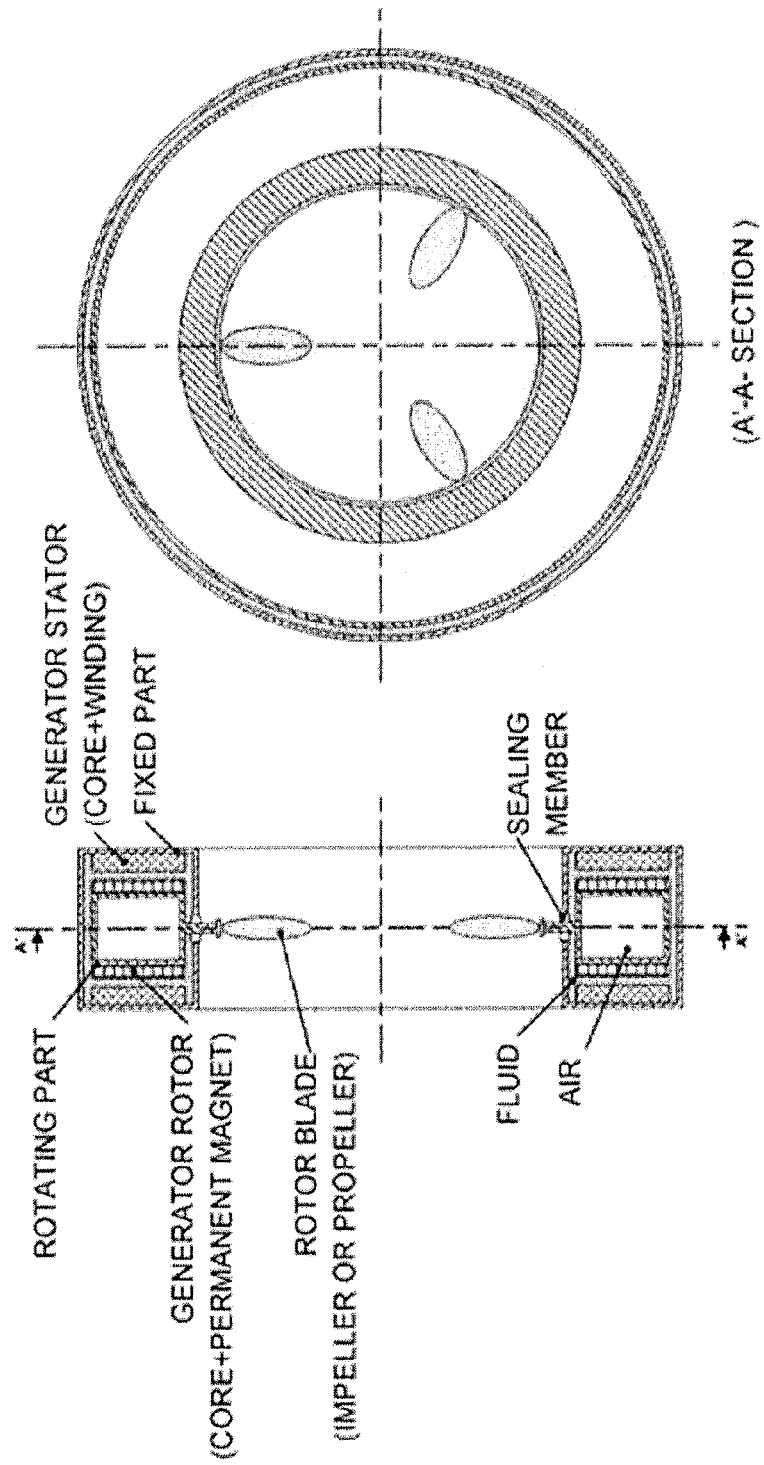
Figure 20:
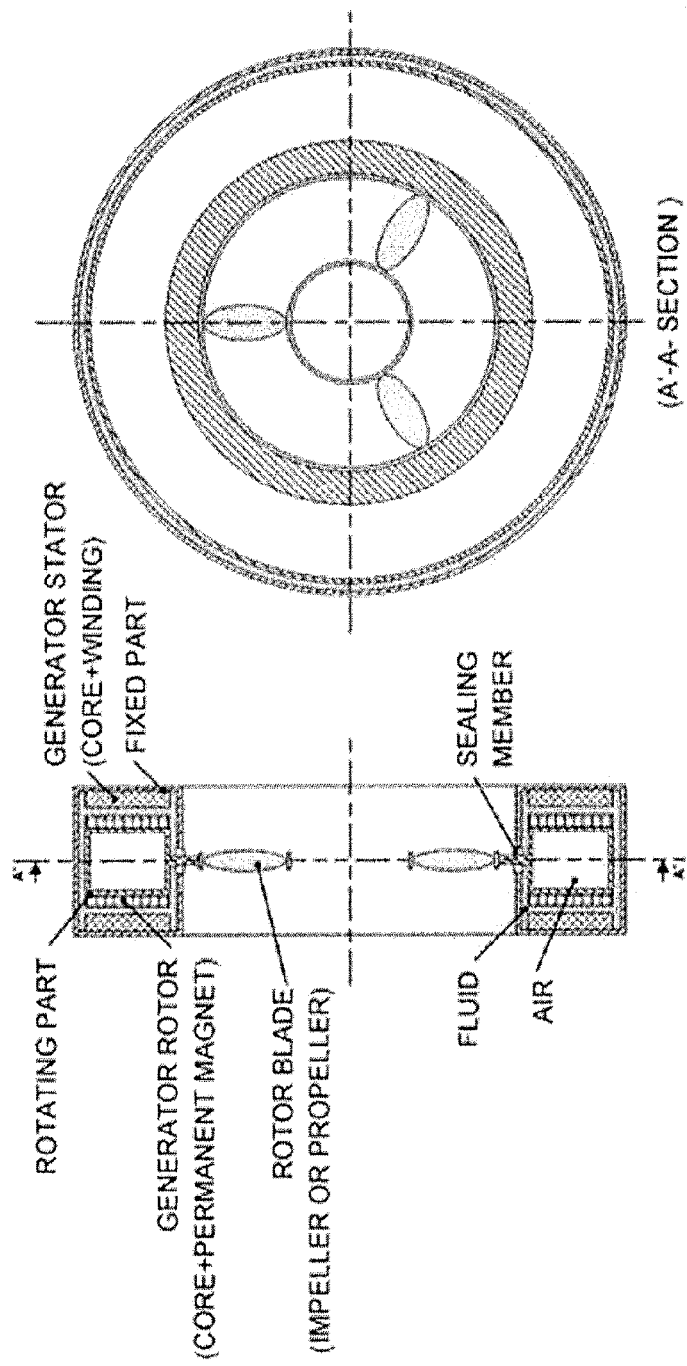

Although FIG. 18 shows the rotor blades are disposed at the outer circumference of the generator (or motor) and the fixed part, the rotor blades may be disposed at the inner circumference of the generator and the fixed part as shown in FIGS. 18 through 20. In this case, when the connection part extends to the outside through a sealing member installed on the inner circumferential surface of the fixed part, the connection part may extend toward the inner circumference of the fixed part, and the rotor blades may also be integrally connected to the connect part at the inner circumference of the fixed part.

The ring-shaped generator (or motor) structure applied with the hydrostatic bearing may also be applied to a low-speed and high-torque generator (or motor) in addition to a wind power turbine. For example, the ring-shaped generator (or motor) structure may be applied to propulsion motors of ship and submarine and tidal- or water-power generators.

According to the embodiments, a direct-drive electric machine can reduce the cost by maximizing the force density and minimizing the active material or electromagnetic material, and can significantly reduce the inactive material or the structural material by applying a bearingless method to support and guide a rotary body such as a rotor. Also, since the rotor and the stator have a modular structure including a plurality of modules that are separately configured, their fabrication, handling, transport, installation, and maintenance are easy.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A direct-drive electric machine comprising a rotor or a mover and a stator, the direct-drive electric machine configured with a plural-module combination structure in which the rotor or the mover and the stator are mutually combined such that a plurality of modules form one phase, respectively,
wherein each module of the rotor or the mover corresponds to each of magnetic poles and is installed and positioned on non-ferromagnetic material of the rotor or the mover,
wherein each module of the rotor or the mover comprises:
two permanent magnets;
a flux-concentrating iron core having an inverted triangular section; and
two path-maintaining iron cores having a triangular section,
wherein the each of the two permanent magnets are disposed between an inclined surface of the flux-concentrating iron core and an inclined surface of each of the two path-maintaining iron cores, and
wherein the two permanent magnets, the flux-concentrating iron core, and the two path-maintaining iron cores are positioned on the non-ferromagnetic material.

2. The direct-drive electric machine of claim 1, comprising a transverse flux generator or a transverse flux motor.

3. The direct-drive electric machine of claim 1, comprising a longitudinal flux generator or a longitudinal flux motor.

4. The direct-drive electric machine of claim 1, wherein the plurality of modules are separately configured to independently perform a function and an operation, respectively.

5. The direct-drive electric machine of claim 1, wherein the stator is disposed at both sides of the rotor or the mover such that air gaps are formed at both sides of the rotor or the mover.

6. The direct-drive electric machine of claim 5, wherein the both air gaps between the rotor or the mover and the stator are maintained by a bearingless-drive that maintains air gap by controlling a current applied to a copper winding of the stator, and the bearingless-drive is formed so as not to sustain a weight of the rotor or the mover.

7. The direct-drive electric machine of claim 6, wherein the winding has a racetrack-shaped structure.

8. The direct-drive electric machine of claim 6, comprising a linear electric machine comprising a mover and a stator.

9. The direct-drive electric machine of claim 5, comprising a structure of an axial flux machine in which the direction of magnetic flux in the both air gaps is the axial direction.

10. The direct-drive electric machine of claim 5, wherein the rotor or the mover comprises a left side rotor or a left side mover corresponding to a left side stator and a right side rotor or a right side mover corresponding to a right side stator.

11. The direct-drive electric machine of claim 5, wherein the rotor and the stator are formed to have a ring-shape.

12. The direct-drive electric machine of claim 5, wherein the air gap between the rotor and the stator is maintained by buoyancy, by hydrostatic bearings supporting the rotor by fluid pressure, and by a bearingless-drive maintaining the air gap through control of a current applied to windings of each stator.

13. The direct-drive electric machine of claim 12, wherein as a generator or a motor:
a ring-shaped fixed part filled with a fluid is fixedly disposed in a fixed structure;
a ring-shaped rotating part is concentrically disposed inside the fixed part;
a stator is disposed inside the fixed part;
a rotor is disposed outside the rotating part at an opposite location to the stator;
the fixed part is filled with the fluid to maintain air gap; and
the rotating part is connected to rotor blades through a connection part extending to the outside of the fixed part.

14. The direct-drive electric machine of claim 13, wherein the rotor blade is disposed at an outer circumference of the fixed part such that the rotating part is connected to the rotor blade through the connection part extending toward the outer circumference of the fixed part.

15. The direct-drive electric machine of claim 13, wherein the rotor blade is disposed at an inner circumference of the fixed part such that the rotating part is connected to the rotor blade through the connection part extending toward the inner circumference of the fixed part.

* * * * *